United States Patent
Tavilla et al.

(10) Patent No.: US 11,592,041 B2
(45) Date of Patent: Feb. 28, 2023

(54) DEVICE FOR INCREASING FLOW CAPACITY OF A FLUID CHANNEL

(71) Applicant: Artisan Industries Inc., Stoughton, MA (US)

(72) Inventors: Peter J. Tavilla, Rochester, MA (US); David Hudson, Stoughton, MA (US); Thomas Gibbons, N. Attleboro, MA (US); Ute Meissner, Medfield, MA (US)

(73) Assignee: Artisan Industries, Inc., Stoughton, MA (US)

( * ) Notice: Subject to any disclaimer, the term of this patent is extended or adjusted under 35 U.S.C. 154(b) by 198 days.

(21) Appl. No.: 17/082,705

(22) Filed: Oct. 28, 2020

(65) Prior Publication Data
US 2022/0128071 A1   Apr. 28, 2022

(51) Int. Cl.
| F15D 1/04 | (2006.01) |
| F16L 43/00 | (2006.01) |
| F04D 29/68 | (2006.01) |
| F16K 47/08 | (2006.01) |

(52) U.S. Cl.
CPC ............... *F15D 1/04* (2013.01); *F16L 43/00* (2013.01); *F04D 29/68* (2013.01); *F16K 47/08* (2013.01)

(58) Field of Classification Search
CPC ............................... F15D 1/04; F16L 43/003
USPC ....................................................... 138/37, 39
See application file for complete search history.

(56) References Cited

U.S. PATENT DOCUMENTS

| 2,590,797 | A | * | 3/1952 | Siciliano | ............... F16L 43/003 285/183 |
| 4,995,426 | A | | 2/1991 | Hinden | |
| 5,213,138 | A | * | 5/1993 | Presz, Jr. | ............... F15D 1/04 138/37 |
| 5,327,940 | A | * | 7/1994 | Presz, Jr. | ............... F15D 1/04 138/37 |
| 6,422,608 | B1 | | 7/2002 | Lee et al. | |

(Continued)

FOREIGN PATENT DOCUMENTS

| EP | 2938700 A4 | | 7/2016 |
| JP | 59170514 | * | 9/1984 |
| WO | 02074621 A1 | | 9/2002 |

OTHER PUBLICATIONS

Bryant Martin, "Cavitation in Control Valves; How Should I Minimize or Maximize Cavitation in Control Valves?", Experts; Control Global; May 5, 2008 (7 pp.).

(Continued)

*Primary Examiner* — Patrick F Brinson
(74) *Attorney, Agent, or Firm* — George Jakobsche Patent Counsel PLLC

(57) ABSTRACT

A fairing, in the form of a contoured restriction, submerged on a fluid channel surface of a fluid channel through which liquid flows, re-distributes velocity fields and flow geometries upstream and in some embodiments downstream of a discontinuity, thereby preventing flow separation, reducing cavitation potential and increasing flow capacity. Such discontinuities include, but are not limited to: joints, for example elbow joints, T-joints and Y-joints; valve-trims; entrance regions to centrifugal pumps; and entrance regions to rotary valves, steps, reductions, expansions and ledges. The fairing may be fitted into the channel or integrally fabricated with the channel.

32 Claims, 17 Drawing Sheets

(56) References Cited

U.S. PATENT DOCUMENTS

| | | | | |
|---|---|---|---|---|
| 7,197,881 | B2* | 4/2007 | Winstanley | F02C 6/08 60/785 |
| 8,944,110 | B2* | 2/2015 | Shiga | F16L 43/008 138/37 |
| 2002/0084138 | A1* | 7/2002 | Weinstein | F15D 1/04 181/268 |
| 2005/0210882 | A1* | 9/2005 | Winstanley | F02C 6/08 60/785 |
| 2008/0149207 | A1* | 6/2008 | Tonetti | F02B 37/225 60/605.1 |
| 2014/0182683 | A1* | 7/2014 | Quanci | F17D 1/02 137/1 |
| 2020/0224616 | A1* | 7/2020 | Haratake | F02B 29/02 |

OTHER PUBLICATIONS

Werner Sölken, "Valves Guide; Trim Numbers of Valves—API 600; Explore the World of Piping"; May 1, 2000 (15 pp.).

Salama, Venkatesh, Conoco Inc., "Evaluation of API RP 14E Erosional Velocity Limitations for Offshore Gas Wells", Offshore Technology Conference, OTC 4485, 1983 (6 pp.).

Honner, R. A., "Maximum Erosional Velocities in Duplex Stainless Steel Production Flowlines and Manifold Pipe and Carbon Steel Water Section Flowlines", BP Miller Study Group, Oct. 1986 (10 pp.).

Det Norske Veritas, "Recommended Practice PR O501 Erosive Wear in Piping Systems", Revision 4.2—2007, Amended Jan. 2011 (43 pp.).

Roth, K.W., Stares, J. A, "Avoid Control Valve Application Problems with Physics-based Models", Hydrocarbon Processing, Aug. 2001 (10 pp.).

Knapp, R., "Recent Investigations of the Mechanics of Cavitation and Cavitation Damage", Transactions of the ASME, Oct. 1955 (10 pp.).

Barton, N. A., TUV NEL Limited, "Erosion in Elbows in Hydrocarbon Production Systems: Review Document", Research Report 115, Health & Safety Executive 2003 (40 pp.).

Shahda, J., "Fluid Velocity Considerations", Dresser/Masoneilan, Technical Information Sheet—TI-PBM/Velocity, Aug. 2002 (2 pp.).

Dr. Monsen, J., "Liquid Flow in Control Valves", Technical Controls, date unknown (40 pp.).

Stinebring, D. et al., "Developed Cavitation-Cavity Dynamics", Applied Research Laboratory, State College, PA (20 pp.).

ISA-RP75.23/1995—Recommended Practice—Considerations for Evaluating Control Valve Cavitation, Instrument Society of America, 1995, Research Triangle Park, North Carolina (60 pp.).

Flowserve, "Cavitation Control", brochure & technical document, Flowserve Corporation, Beaumont, TX, 2006 (20 pp.).

Brennen, C., "Fundamentals of Multiphase Flows", Cambridge University Press, 2005, pp. 128-138 (410 pp.).

Stares, J., "Control Valve Cavitation, Damage Control", Dresser-Masoneilan publication, Feb. 2007 (10 pp.).

International Searching Authority (European Patent Office), International Search Report and Written Opinion re International Application No. PCT/US2021/052343, 18 pages, dated Jan. 12, 2022.

* cited by examiner

DEVICE FOR INCREASING FLOW CAPACITY OF A FLUID CHANNEL

BACKGROUND

Technical Field

The present invention relates to fluid mechanics and, in particular, to a fairing for increasing flow capacity of a fluid channel, such as to reduce or prevent cavitation around joints, valves and other geometric discontinuities.

Related Art

Maximizing liquid flow capacity through fluid management devices, such as valves, pipes, instruments, pumps, etc. (collectively fluid channels), has been a long-standing industry challenge to designers. Limitations to flow capacity are generally influenced by static pressure of flowing fluid, physical properties and characteristics such as temperature, viscosity, surface tension, vapor pressure, presence of solids and flow path geometry, among other factors. The consideration of these factors leads to designs that reduce cavitation and pressure drops across components during operation at high flow rates.

Cavitation is a phenomenon in which a pressure change in a liquid leads to formation of small vapor-filled cavities in places where the local pressure of the fluid is reduced below the liquid's vapor pressure. Later, when subjected to a higher pressure, these cavities collapse and can generate shock waves. Collapsing cavities that implode near metal or flow boundary surfaces cause cyclic stress through repeated implosions. This results in damage to the surface and in some cases significant physical damage. Such pressure changes frequently occur near bends in pipes and in other tortuous fluid channel paths, where sudden changes in direction of fluid flow occur. Cavitation is a significant cause of component damage in some engineering contexts.

Extensive work in the design of control valves has resulted in several cavitation-reducing devices and strategies, which in turn has led to guidance in the form of industry standards [1]. Currently-available cavitation-reducing devices and strategies include cage trims [2, 3], hardened trim materials to withstand the effects of cavitation [4] and generally increased overall sizes and volumes of transition regions where cavitation and undesirable pressure drop occurs. These devices and strategies often require specialized and expensive manufacturing techniques and/or contribute to increased costs due to size increases of resulting equipment.

Beyond applications in pipes, valves, instruments and pumps, technologies for improving fluid flow have been employed in aeronautics for many decades. For example, leading edge slats, Fowler flap designs and vortex generators applied to specific locations on airplane surfaces improve air-flow characteristics. A dimpled surface of a golf ball provides another example of a structural feature configured to improve gas flow around an immersed object. In each of these examples, flow separation, i.e., separation of flowing fluid away from a surface, is reduced, resulting in improved performance. Nevertheless, conventional liquid-carrying channels, such as pipes, fittings and valves, are frequently damaged by cavitation. There is, therefore, a need for a device for increasing flow capacity of a fluid channel.

SUMMARY OF EMBODIMENTS

An embodiment of the present invention provides a device for increasing flow capacity of a fluid channel in a downstream direction. The fluid channel has a channel surface (304, 308). The channel surface is configured for liquid flow there along. The channel surface includes a discontinuity. The device includes a fairing. The fairing defines a respective fairing surface. The fairing surface is located entirely in the fluid channel. The fairing surface is configured for liquid flow there along. The fairing surface extends from a respective leading edge of the fairing surface located upstream of the discontinuity to a respective trailing edge of the fairing surface located downstream of the leading edge. The fairing surface extends at least as far as the discontinuity.

At the leading edge, the fairing surface is tangent the channel surface. At the trailing edge, the fairing surface is tangent the channel surface. The fairing surface follows a curve that smoothly transitions between the leading edge and the trailing edge.

Optionally, in any embodiment, the fairing surface follows a reverse curve that smoothly transitions between the leading edge and the trailing edge.

Optionally, in any embodiment, the trailing edge of the fairing surface is located no further downstream than the discontinuity.

Optionally, in any embodiment, the trailing edge of the fairing surface is located downstream of the discontinuity.

Optionally, in any embodiment in which the trailing edge of the fairing surface is located downstream of the discontinuity, the fairing surface follows an at least two-cycle reverse curve.

Optionally, in any embodiment, the fluid channel defines a volume configured for liquid flow therethrough and at least a portion of the fairing surface between the leading edge and the trailing edge is displaced a positive distance, measured perpendicular to the downstream direction, into the volume of the fluid channel from a hypothetical channel surface of the channel absent the fairing.

Optionally, in any embodiment, the fluid channel defines a volume configured for liquid flow therethrough and, at each location along the downstream direction, between the leading edge and the trailing edge, the fairing surface is displaced a positive distance, measured perpendicular to the downstream direction, into the volume of the fluid channel from a hypothetical channel surface of the channel absent the fairing.

Optionally, in any embodiment, at each corresponding location along the downstream direction, between the leading edge and the trailing edge, a cross-sectional fluid flow area, measured perpendicular to the downstream direction and taking into account the fairing, of the fluid channel is no greater than a hypothetical cross-sectional fluid flow area absent the fairing.

Optionally, in any embodiment, the discontinuity is defined by a portion of the fluid channel: (a) having an elbow-shape, a T-shape or a Y-shape or (b) including an entrance region to a centrifugal pump or to a rotary valve.

Optionally, in any embodiment, the fairing is configured for permanent or temporary installation in the fluid channel.

Optionally, in any embodiment, the fairing is formed as an integral part of the fluid channel.

Optionally, in any embodiment, the fairing surface is smooth.

Optionally, in any embodiment, the fairing surface is dimpled, rough or patterned.

Optionally, in any embodiment in which the fairing surface is dimpled, rough or patterned, the fairing surface defines a surface pattern configured to cause, in response to flow of fluid there along, emission of an acoustic signal indicative of a predetermined flow characteristic of the fluid.

Optionally, in any embodiment, the fairing includes a pin, and the fairing is configured to pivot about the pin.

Optionally, in any embodiment, the fairing defines as hollow portion and an aperture between the hollow portion and the fluid channel. The hollow portion and the aperture are configured to emit an oscillating acoustic signal in response to a fluid flow across the aperture.

Optionally, in any embodiment, the fairing defines a bladder in fluid communication with a control port. The bladder is configured to change the shape of the surface of the fairing 302 in response to inflation of the bladder.

Optionally, in any embodiment in which the fairing defines a bladder, the fairing 312 defines at least one pressure sensing port fluidically coupled to a respective gauge port.

Optionally, in any embodiment that includes a gauge port, the gauge port is fluidically coupled to the control port.

Optionally, in any embodiment, the fairing defines at least one passage through the fairing. Each passage fluidically connects a respective upstream portion to a respective downstream portion of the fairing. Each passage defines a respective upstream opening and a respective downstream opening. Each passage is configured to permit at least a portion of liquid flowing in the fluid channel to bypass full profile of the fairing.

Optionally, in any embodiment, the fairing includes an upstream portion and a downstream portion joined together by a pivot hinge. An upstream end of the upstream portion is translatably attached to the channel surface. The two portions and are configured to pivot in response to translation of the upstream end of the upstream portion and thereby extend the pivot hinge, the downstream end of the upstream portion and the upstream end of the downstream portion further into the fluid channel. The fairing further includes a spring configured to urge the upstream end of the upstream portion to a neutral position.

Optionally, in any embodiment, the fairing defines a first bladder and a second bladder. The first bladder is in fluid communication with a port downstream of the fairing in the fluid channel. The second bladder is in fluid communication with a port upstream of the fairing in the fluid channel. The first and second bladders are configured to automatically regulate shape of the fairing, based on respective pressures at the ports.

Optionally, in any embodiment, the channel surface includes a second discontinuity. The device further includes a second fairing. The second fairing defines a respective second fairing surface. The second fairing surface is located entirely in the fluid channel. The second fairing surface is configured for liquid flow there along. The second fairing surface extends from a respective leading edge of the second fairing surface located upstream of the discontinuity to a respective trailing edge of the second fairing surface located downstream of the leading edge. The second fairing surface extends at least as far as the discontinuity.

At the leading edge, the second fairing surface is tangent the channel surface. At the trailing edge, the second fairing surface is tangent the channel surface. The second fairing surface follows a curve that smoothly transitions between the leading edge and the trailing edge.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Figure 1:
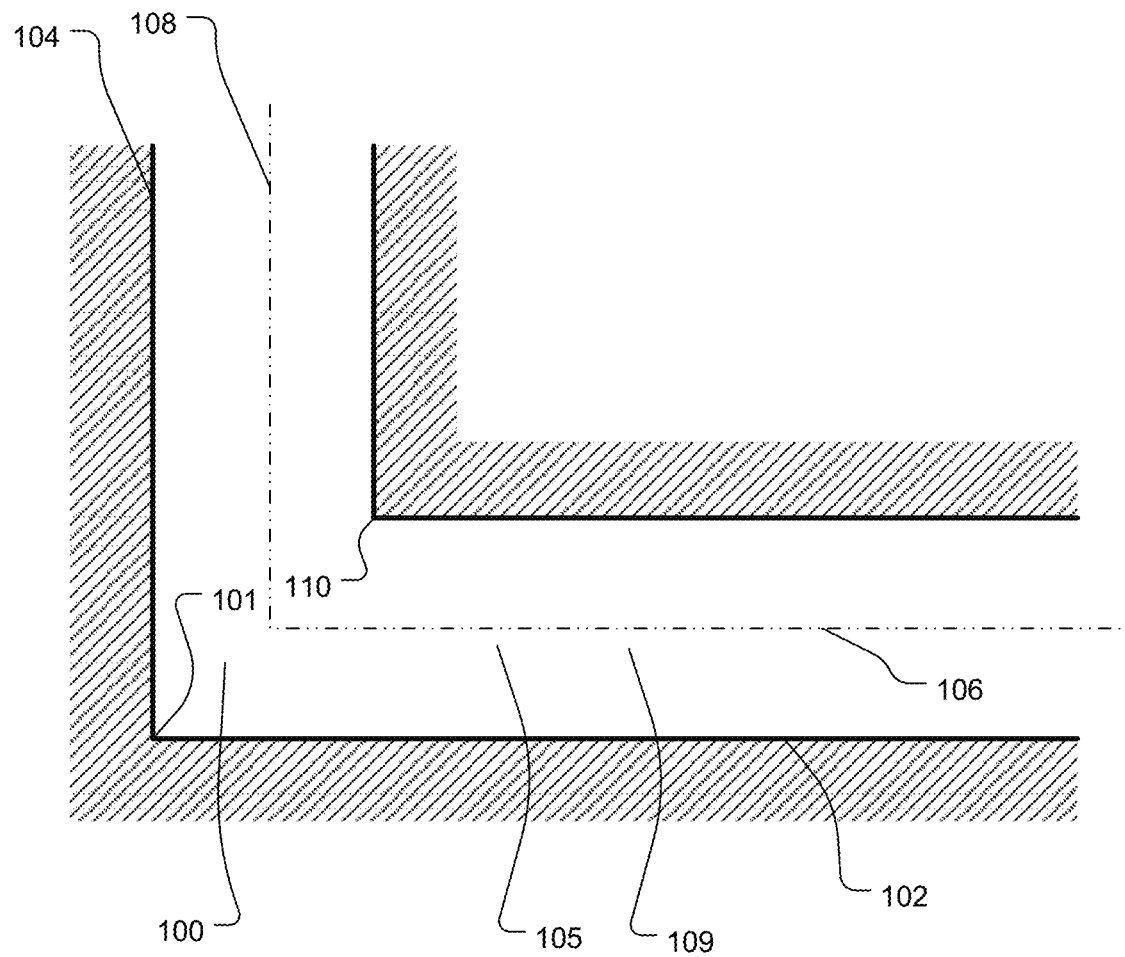
FIG. 1 is a cross-sectional view of a fluid channel, including a 90° elbow joint and pipes leading into and out of the elbow joint, according to the prior art.

Embodiments of the present invention introduce one or more fairings into a flow field of a fluid channel, upstream and/or downstream of a geometric discontinuity that may otherwise lead to performance degradation within a liquid flowing through the flow field. Such discontinuities include, but are not limited to, sudden changes in direction, for example elbows, Ts, Ys, valve trims and entrance or exit regions of centrifugal pumps and rotary valves. Flowing liquid may, but need not necessarily, have a free surface, but the fairing is intended to be fully submerged in the liquid, at least when the fairing is performing its function. The presence of the one or more fairings improves flow performance, such as facilitating a higher flow rate for a given pressure drop, reducing flow separation and/or reducing cavitation.

Through use of hydrodynamically designed channel restrictions, fairings improve liquid flow characteristics where flow separation, cavitation or other discontinuities would otherwise limit performance.

Definitions

As used in this description and the accompanying claims, the following terms shall have the meanings indicated, unless the context otherwise requires:

A "fluid channel" is a passage through which a liquid can flow. The term "liquid" includes a slurry, as well as a liquid with suspended or entrained particles or gases. Examples of fluid channels include pipes, pumps, valves and fittings, such as elbows, T-joints and Y-joints. A fluid channel surrounds and retains the liquid flow perpendicular to a flow direction of the fluid. A fluid channel defines a cross-sectional area and a volume, through which the liquid flows. In general, the liquid is in contact with an inside surface of the fluid channel, although the liquid may define a free surface that is not in contact with the inside surface of the fluid channel. For example, in a pipe that is only partially filled with a liquid, the liquid is in contact with an inside, typically bottom, surface of the pipe, but the liquid also defines a free surface that is not in contact with the inside surface of the pipe.

A "discontinuity" (also referred to herein as a "geometric discontinuity") is a feature, geometric or otherwise, of a fluid channel that causes a change in pressure of a fluid flowing through the fluid channel, other than a pressure change due to frictional loss incurred at a wall of the fluid channel. At a discontinuity, streamlines of the flowing fluid are not tangent to the channel wall in a general direction of the flowing fluid. In many cases, a discontinuity is characterized by a sudden, relative to overall length and/or direction of the fluid channel, change in flow direction of fluid moving through the channel. Examples of discontinuities include but are not limited to elbows, T-joints, Y-joints, steps, reductions, expansions, ledges, valve trims, entrances to centrifugal pumps and entrance and exit regions to valves.

A "restriction" of a fluid channel is a region of the channel where volume per unit length of the channel decreases.

"Vena contracta" is a point in a fluid stream where diameter of the stream is minimum and fluid velocity is maximum, such as in a stream exiting from a nozzle. A vena contracta can occur at a flow restriction that occurs at a geometric discontinuity in a fluid channel. Flow streamlines are unable to abruptly change direction at such a discontinuity, causing the streamlines to converge, resulting in flow narrowing, flow separation and eventually cavitation.

A "fairing" is device that creates a contoured restriction of a fluid channel. A fairing may be a separate component from the channel that is fitted onto an inner surface of the channel, thereby forming a contoured restriction of the channel, or a fairing may be an integral geometric part of the channel, i.e., fabricated as a unit with the fluid channel.

A "reverse curve" (S-shaped curve) is a curve to the left or right followed by a curve in the opposite direction.

"Resilient" means able to absorb energy when elastically deformed, and recoil or spring back into shape upon unloading, whereupon at least some of that energy is released.

A surface that is "concave along the direction of liquid flow" is a surface that expands outward along the path of liquid flow, as if the diameter of a pipe or tube were enlarged locally due to internal pressure.

A surface that is "convex along the direction of liquid flow" is a surface that contracts inward along the direction of the liquid flow as if the diameter of a pipe or tube were squeezed locally due to external pressure. Thus, in an elbow, as exemplified in FIG. 1, a concave inner wall has a greater radius, such as at 101, than a convex inner wall radius, such as at 110. A fairing enlarges or otherwise modifies a convex surface.

An "integral" geometry or an "integral" part of a fluid channel describes a structure that is constructed as a piece with the fluid channel. Such an integral geometry is distinguished from a structure that is separately formed from the fluid channel and that is later fitted into the fluid channel.

Fairing

As noted, embodiments of the present invention introduce one or more fairings into a flow field of a fluid channel, upstream and/or downstream of a geometric discontinuity that may otherwise lead to performance degradation within a liquid flowing through the flow field. An upstream fairing is characterized by: (a) a smooth transition from an inner surface of a fluid channel upstream of the discontinuity and (b) a smooth transition to the inner surface at or downstream of the discontinuity, in the direction of flow streamlines.

The fairing may have a surface between transition regions that is smooth, dimpled, roughened or patterned with static geometric features. Such features may be necessary for assembly and installation, to modulate (increase or decrease) turbulence levels, aid in heat transfer, capture entrained solids or gases, or be designed to function as a Helmholtz resonator to emit an acoustic signal that can be measured to provide feedback for flow control.

The internal volume of the fairing need not be solid and may include a cavity or series of cavities. In some embodiments, cavities within the fairing may be interconnected to each other and/or to flow regions upstream and/or downstream of the fairing, and/or to fluid or gas reservoirs external to the fairing and flow field and/or to instruments.

Cavities within the fairing can provide space for interconnection of the cavities with fluids for temperature control, and/or to house instruments to monitor parameters related to the fluid flow, such as liquid pressure, vapor pressure, viscosity, specific gravity, surface tension, temperature and/or flow rate. Cavities within the fairing may also connect to adjustable flaps that can open to direct moving liquid through the cavities, thereby allowing for improved performance over multiple flow regimes.

Geometric features of the fairing's surfaces may be selected according to parameters related to liquid flow, such as velocity, vapor pressure, viscosity, specific gravity and surface tension. Where spline curves are used to describe curvature of a fairing surface, the splines may be defined by continuous polynomials of order 2 or higher. The curvature of the fairing surface is not, however, restricted to description by standard polynomials, and may be expressed as ellipses, involutes, catenaries, evolutes or any suitable mathematical or geometric representation(s) or portion thereof. A variety of functions, including polynomials, may be used to curve-fit a fairing to an anticipated flow profile.

Polynomial values of a transition region of a fairing may be tailored to a desired flow velocity and may vary in size and location based on velocity, viscosity, vapor pressure and/or other characteristics of the fluid.

Each fairing may have a single component or feature, or the fairing may be a composite of multiple components and/or features. A fairing or fairings may span a discontinuity and downstream regions.

Distinctions from Vanes and Conventional Vehicle Fairings

Fairings, according to the present invention, are distinct from vanes, in at least the following aspects. A vane is designed to decrease radius of curvature of a flowing fluid to hold the flowing fluid closer to an existing or desired geometry (sometimes boundary) than the fluid would flow absent the vane. In contrast, a fairing, according to the present invention, is configured to increase the radius of curvature of a flowing fluid and/or change the effective volume of a fluid channel at a discontinuity. A fairing can be viewed as changing the radius of curvature of an inner surface of a flow channel to more closely match a natural radius of curvature of a flowing fluid. Thus, a fairing is the opposite of a vane. Whereas a vane is designed to alter a natural fluid flow path to make the fluid flow path conform to a geometric surface, a fairing alters the geometric surface to more closely conform to a natural fluid flow path.

A vane does not contact an existing flow boundary but rather is suspended within the flow, when viewed in a plane normal to the flow. A vane is thus proximate, i.e., near but spaced apart from, the flow boundary. In general, fairings, as described herein, contact existing flow boundaries.

A vane does not re-distribute the curvature of the existing flow boundary or re-distribute the existing flow velocity profile. A fairing manipulates these characteristics.

Fairings described herein are distinct from conventional aircraft fairings, bicycle or motorcycle fairings, payload fairings and cable fairings. An aircraft fairing is a structure that covers gaps or spaces between parts of an aircraft to reduce form drag and interference drag, and to improve appearance. A bicycle fairing is a full or partial covering for a bicycle to reduce aerodynamic drag or to protect the rider from the elements. A motorcycle fairing is a shell placed over a frame of a motorcycle, especially a racing or sport motorcycle, with a primary purpose to reduce air drag. Secondary functions are protecting a rider from airborne hazards and wind-induced hypothermia, and protecting engine components in the case of an accident. A motorcycle fairing almost always includes an integrated windshield. A payload fairing is a nose cone used to protect a spacecraft (launch vehicle payload) against dynamic pressure and aerodynamic heating during launch through an atmosphere. A cable fairing is a structure attached to a towed cable designed to streamline the flow around the cable, primarily in marine environments.

Exemplary Problem

FIG. 1 is a cross-sectional view of a conventional 90° elbow joint 100, with pipes 102 and 104 leading into and out of the elbow joint 100. The elbow joint 100 and pipes 102-104 collectively define a fluid channel 105. General directions of fluid flow in the fluid channel 105 are indicated by axes 106 and 108. The fluid channel 105 defines a volume 109, through which a liquid can flow. As can be seen in FIG. 1, the general direction of fluid flow changes suddenly at the elbow 100 which, as discussed, can cause cavitation. The elbow 100 introduces a discontinuity 110, here exemplified by a sharp corner. It should, however, be noted that sharpness of a corner is relative. Even a round corner can cause cavitation, depending on characteristics of a fluid flow, in relation to geometry and/or dimensions of the corner. Thus, as used herein, the term "discontinuity" includes any place in a fluid channel where direction of a fluid flowing through the fluid channel would suddenly change and, under conceivable operating conditions, that change in direction could cause cavitation or negatively influence flow performance.

Figure 2:
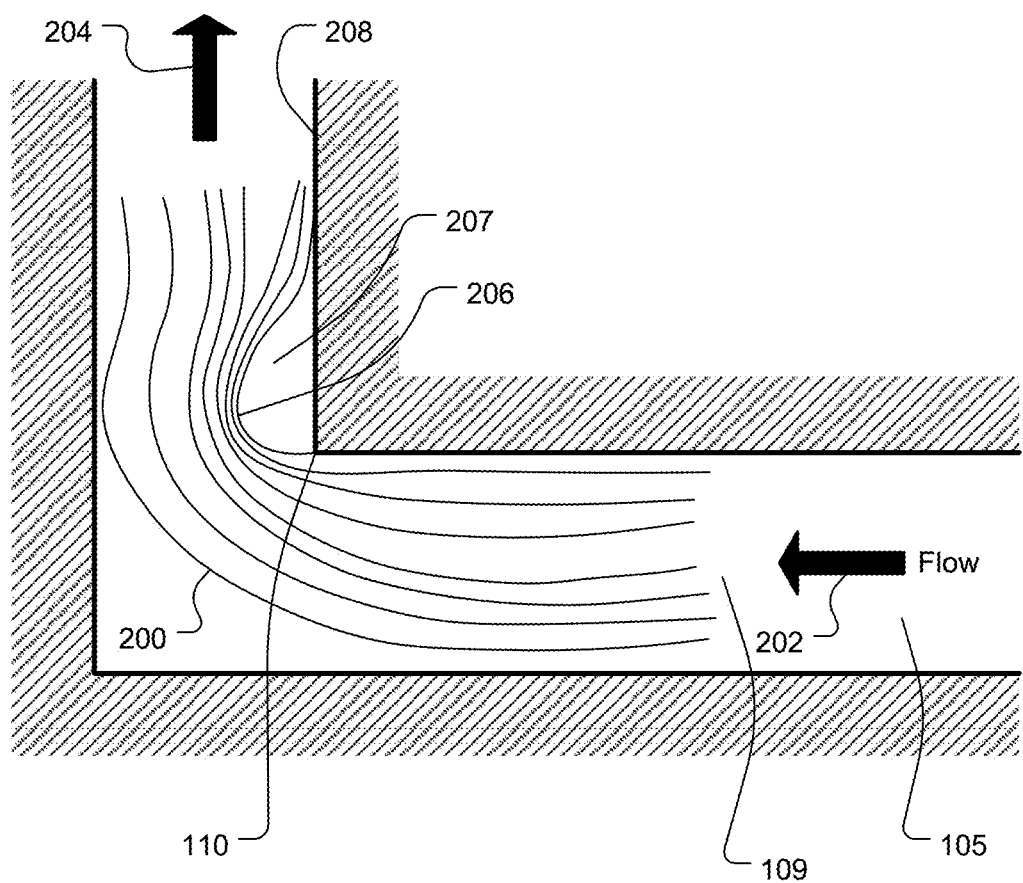
FIG. 2 is a cross-sectional view of the fluid channel of FIG. 1, including streamlines representing a fluid flowing through the fluid channel, according to the prior art.

FIG. 2 is a cross-sectional view of the elbow joint 100 of FIG. 1, except streamlines 200 represent a fluid flowing through the elbow joint 100. Arrows 202 and 204 indicate directions of the fluid flow. The direction 202 suddenly changes to the direction 204 at the discontinuity 110. In the example shown in FIG. 2, as a result of the sudden direction change, the flow streamlines 200 are unable to follow the sharp edge of the discontinuity 110, leading to a vena contracta 206 and resulting in a pressure drop and flow separation 207 of the streamlines 200 from the inner surface 208 of the fluid channel 105. At high velocity flows, the pressure drop and wall separation 207 lead to cavitation and eventually to structural damage of the fluid channel 105.

Exemplary Embodiments

Figure 3:
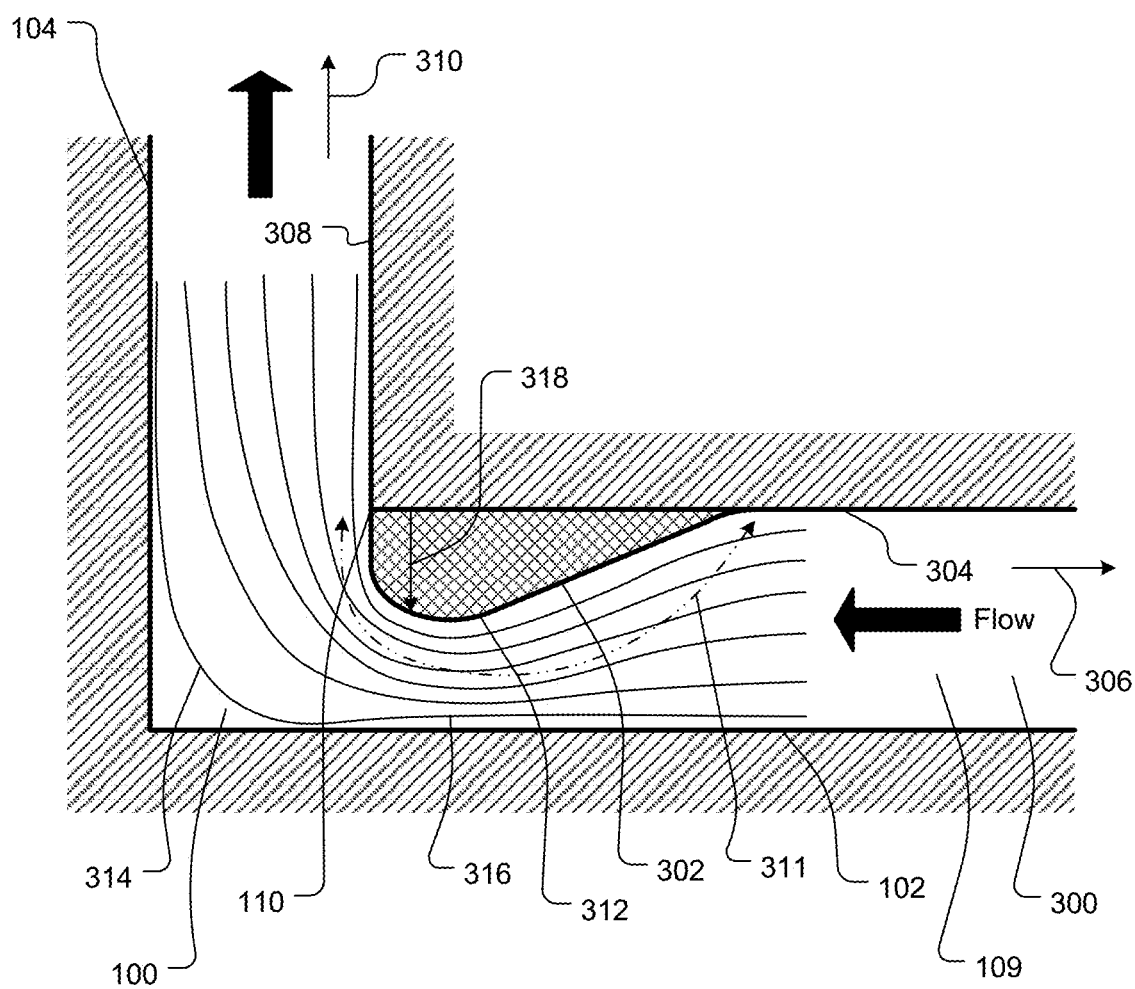
FIG. 3 is a cross-sectional view of a fluid channel, similar to the fluid channel of FIGS. 1 and 2, except with a fairing installed in the fluid channel, according to an embodiment of the present invention.

FIG. 3 is a cross-sectional view of a fluid channel 300, similar to the fluid channel 105 of FIGS. 1 and 2, except with a fairing 302 installed in the fluid channel 300, according to an embodiment of the present invention. Arrows 306 and 310 indicate upstream and downstream directions, respectively. As can be seen in FIG. 3, the fairing 302 provides a smooth transition from a portion of the fluid channel 300 upstream 306 of the discontinuity 110, for example from an inner wall surface 304 of the pipe 102, to a portion of the fluid channel 300 downstream 310 of the discontinuity 110, for example to an inner wall surface 308 of the pipe 104. The fairing 302 thus defines a transition region 311.

In contrast to the prior art, the fairing 302 causes fluid to flow smoothly, following a surface 312 of the fairing 302 continuously around the transition region and the discontinuity 110, thereby increasing fluid velocity at which flow separation from the surface 304 and/or 308 of the fluid 300 channel would occur, compared to the prior art, and reducing cavitation for a given fluid velocity. Improved flow behavior is evident from the streamlines 314. For example, at 316 it can be seen that a locally higher velocity is maintained than in the prior art, while wall contact is maintained.

Thus, FIG. 3 exemplifies a device for increasing flow capacity of a fluid channel 300 in a downstream direction 310. The fluid channel 300 may be, for example, two pipes 102 and 104 joined by an elbow 100, as discussed with reference to FIGS. 1 and 2. The fluid channel 300 has a channel surface 304/308 configured for fluid to flow along the channel surface 304/308. The channel surface 304/308 may be an inner wall surface of the pipes 102 and 104, as well as a portion of the elbow 100. The channel surface 304/308 includes a discontinuity 110, such as a sharp bend.

The device includes a first fairing 302. In normal use, the first fairing 302 should be fully submerged in the fluid flowing in the fluid channel 300. The first fairing 302 defines a respective fairing surface 312. The fairing surface 312 is located entirely in the fluid channel 300. The fairing surface 312 is configured for fluid flow along the fairing surface 312.

Figure 4:
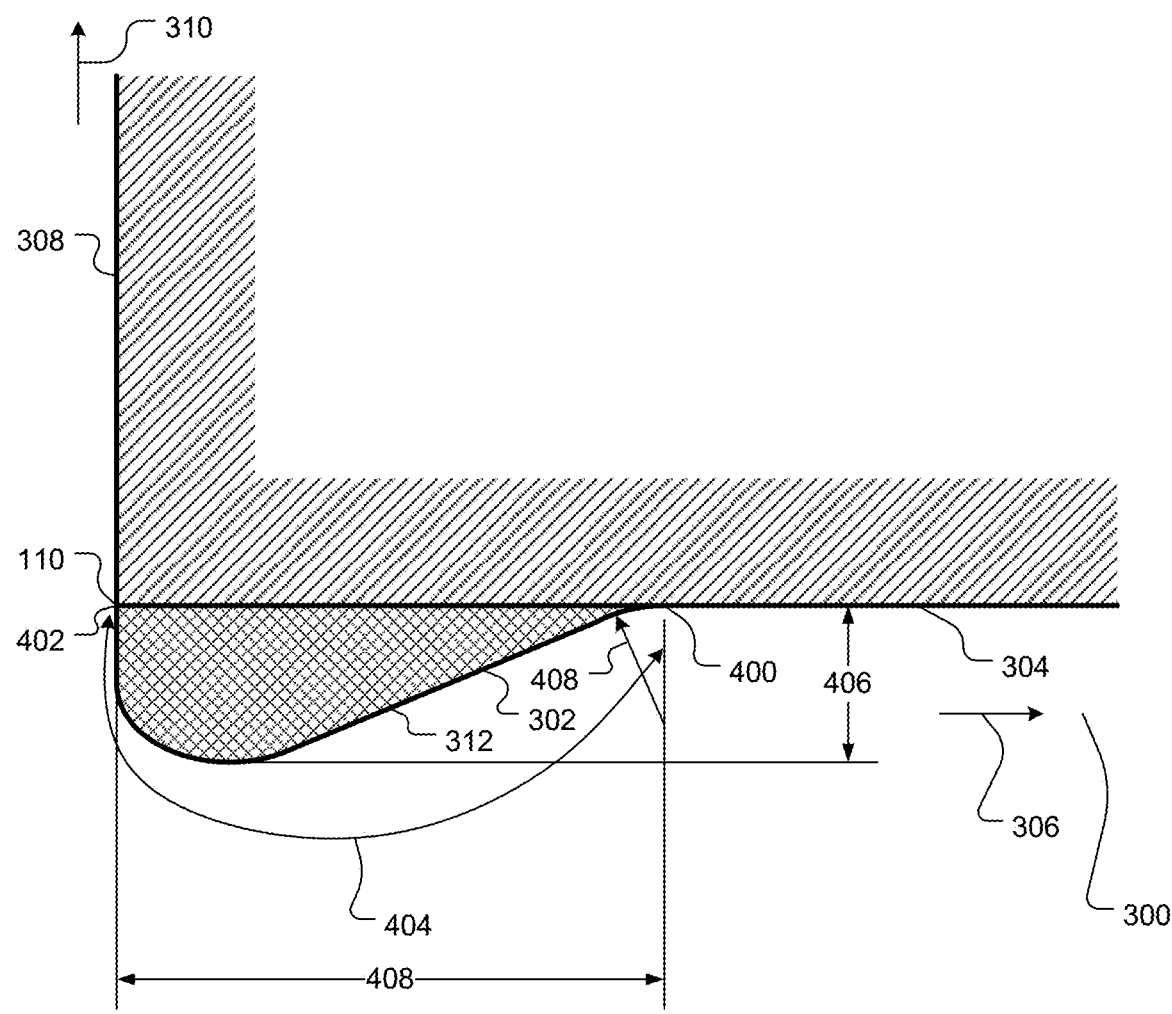
FIG. 4 is an enlarged view of the fairing of FIG. 3, including a portion of the fluid channel, according to an embodiment of the present invention.
Figure 4:
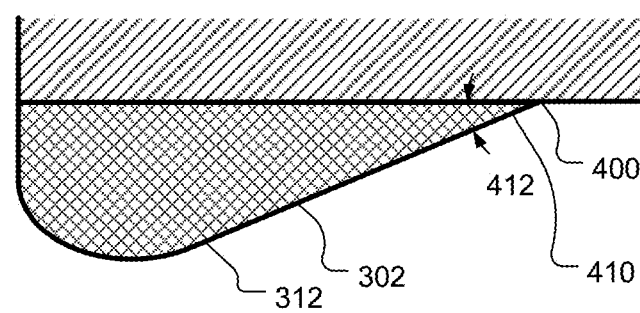
Figure 4:
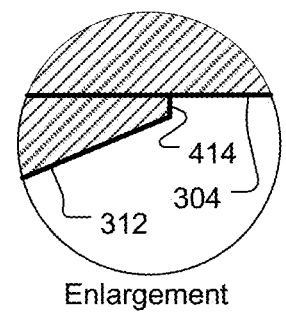
Figure 5:
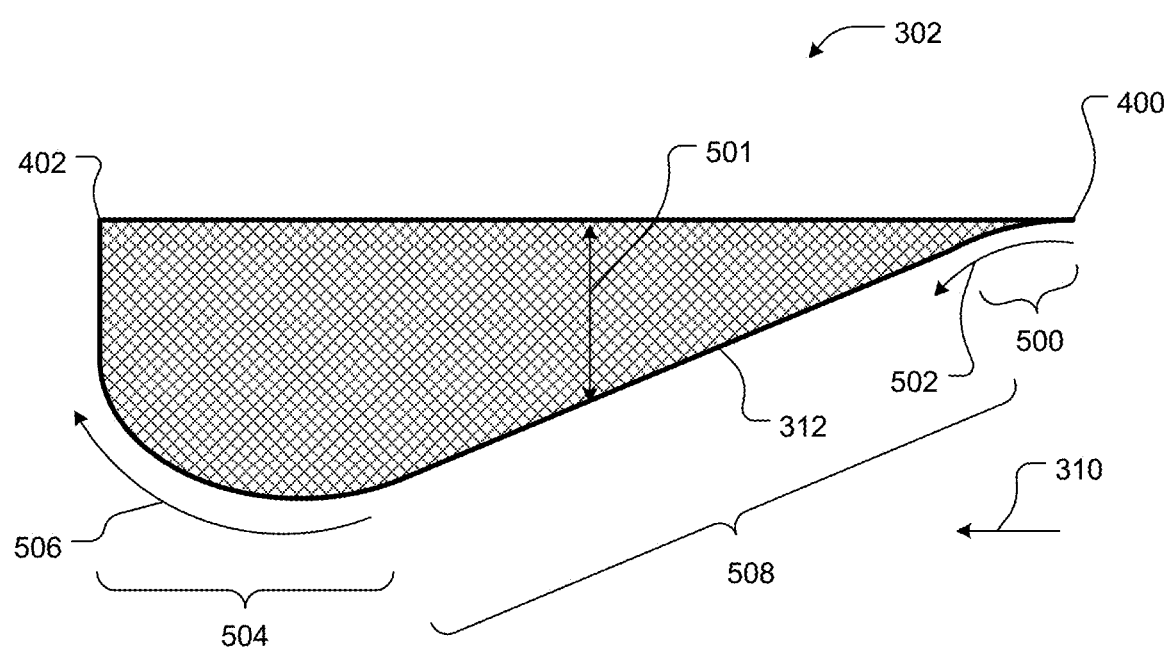
FIG. 5 is a further enlarged view of the fairing of FIGS. 3 and 4, according to an embodiment of the present invention.

FIG. 4 is an enlarged view of the fairing 302 of FIG. 3, including a portion of the fluid channel 300. FIG. 5 is a further enlarged view of the fairing 302 alone. The fairing surface 312 extends from a respective leading edge 400 of the fairing surface 312 located upstream 306 of the discontinuity 110 to a respective trailing edge 402 of the fairing surface 312 located downstream 310 of the leading edge 400, at least as far as the discontinuity 110. Double-headed arrow 404 (FIG. 4) indicates an extent of the fairing surface 312.

The fairing 302 varies in thickness 406 over its length 408, where "thickness" means a dimension between the fairing surface 312 and a hypothetical inner wall surface 304 of the fluid channel 300, absent the fairing 302. Dimension 501 is an exemplary thickness of the fairing 302 at one point along the fairing surface 312. The fairing 302 is tapered proximate (i.e., becomes progressively thinner closer to) the leading edge 400, ideally to be as thin as practical, given material, fabrication and other practical constraints. In the embodiment shown in FIGS. 3-5, the fairing surface 312 proximate the leading edge 400 is convex curved, having a radius 408 (FIG. 4).

In other embodiments, for example as shown in an Insert in FIG. 4, the fairing surface 312 proximate the leading edge 400 may be in the form of a sloped, but straight, ramp 410, which forms a relatively small angle 412 with the channel surface 304. The angle 412 may be selected based on expected operating conditions and manufacturing practicalities. These factors may be traded-off against each other. For example, the angle 412 may be selected to be small enough to divert a flowing fluid without significantly negatively affecting performance, while being thick enough to be economically manufactured. In general, angle 412 is less than about 75°. In some embodiments, angle 412 is less than about 60°, or less than about 40°, or less than about 30°, or less than about 25°, or less than about 7°.

In either case, i.e., curved, stepped or straight, at the leading edge 400, the fairing surface 312 is referred to herein as being "tangent" the channel surface 304. Tangent includes the conventional mathematical and geometric meaning. However, as used herein, tangent also takes into account practical aspects of manufacturing fairings 302. A transition from an inner wall (channel surface) 304 to the fairing surface 312 should be smooth and continuous, to the extent practical. For example, since metal, plastic and other practical materials cannot be made infinitely thin, if a fairing 302 is fabricated as a separate unit to be attached to the inner wall (channel surface) 304, the leading edge 400 may include a small but finite step 414, for example as shown in an Enlargement in FIG. 4. Similarly, a straight leading edge 400 that meets the channel surface 304 at the angle 412 is considered to be tangent the channel surface 304. All the embodiments described herein are within the meaning of tangent. At the trailing edge 402, the fairing surface 312 is tangent the channel surface 308, using the same definition of tangent as for the leading edge 400.

In some embodiments, for example as shown in FIGS. 3-5, the fairing surface 312 follows a reverse curve that smoothly transitions between the leading edge 400 and the trailing edge 402. For example, as best seen in FIG. 5, in a first portion 500 of the fairing surface 312 proximate the leading edge 400, the fairing surface 312 follows a curve to the left 502 (as viewed in the downstream direction 310), and in a second portion 504, downstream of the first portion 500, the fairing surface 312 follows a curve to the right 506. The two portions 500 and 504 may be connected to each other by a straight portion 508, as shown in FIG. 5. In this case, the curve reverses along or in the straight portion 508. Optionally, the two portions 500 and 504 may be connected to each other by a curved portion (not shown), or the two portions 500 and 504 may be directly connected to each other (not shown) and therefore tangent in the strict mathematical sense of the term.

In the embodiments shown in FIGS. 3-5, the portion 500 (labeled in FIG. 5) of the fairing surface 312 proximate the leading edge 400 is concave to linear in the downstream direction 310. This portion 500 smoothly transitions from the channel surface 304 (FIG. 4) upstream 306 of the discontinuity 110 to the trailing edge 402. The portion 504 (FIG. 5) of the fairing surface 312 proximate the trailing edge 402 is convex to linear in the downstream direction 310. This portion 504 in turn transitions to the channel surface 308 proximate the discontinuity 110. As can be discerned from FIG. 5, the portion 500 of the fairing surface 312 proximate the leading edge 400 is configured to increase the radius of curvature of the flowing fluid, thereby directing the flowing fluid away from the channel surface 304. This results in increased fluid velocity at which flow separation from the fairing surface 312 occurs, and reduced cavitation for a given fluid velocity.

Figure 6:
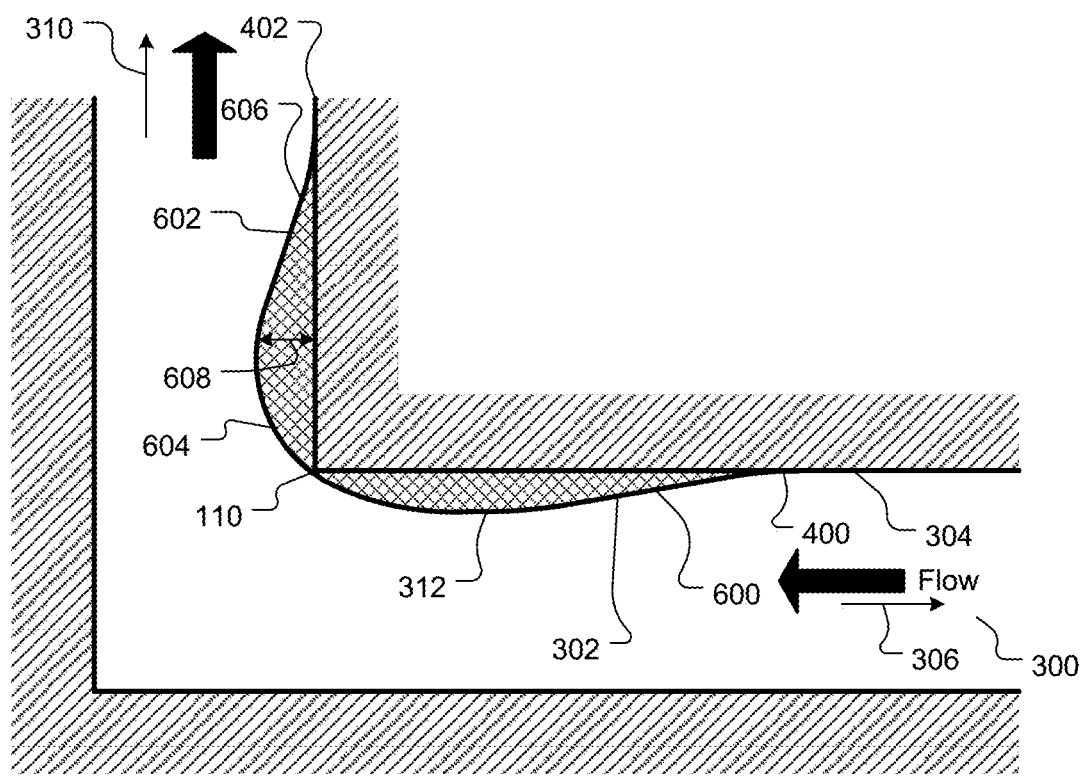
FIG. 6 is a cross-sectional view of a fluid channel, similar to the fluid channel of FIGS. 3-5, except with a variation of the fairing, in this case a fairing that spans a discontinuity, installed in the fluid channel, according to an embodiment of the present invention.

FIG. 6 is a cross-sectional view of a fluid channel 300, similar to the fluid channel 300 of FIGS. 3-5, except with a variation on the fairing 302 installed in the fluid channel 300, according to an embodiment of the present invention. The trailing edge 402 of the fairing surface 312 described with respect to FIGS. 3-5 is located no further downstream 310 than the discontinuity 110. However, in the variation of the fairing 302 shown in FIG. 6, the trailing edge 402 of the fairing surface 312 is located downstream 310 of the discontinuity 110. In other words, the variation fairing 302 spans the discontinuity 110. Among other attributes, the fairing of FIG. 6 facilitates flows in either direction (310 or 306).

The fairing surface 312 of the variation fairing 302 shown in FIG. 6 follows an at least two-cycle reverse curve, meaning the curve reverses direction at least twice. The fairing surface 312 of FIG. 6 reverses curve direction (to the left) at or near a point 600, and the fairing surface 312 reverses curve again (this time to the right) at or near another point 602.

Figure 7:
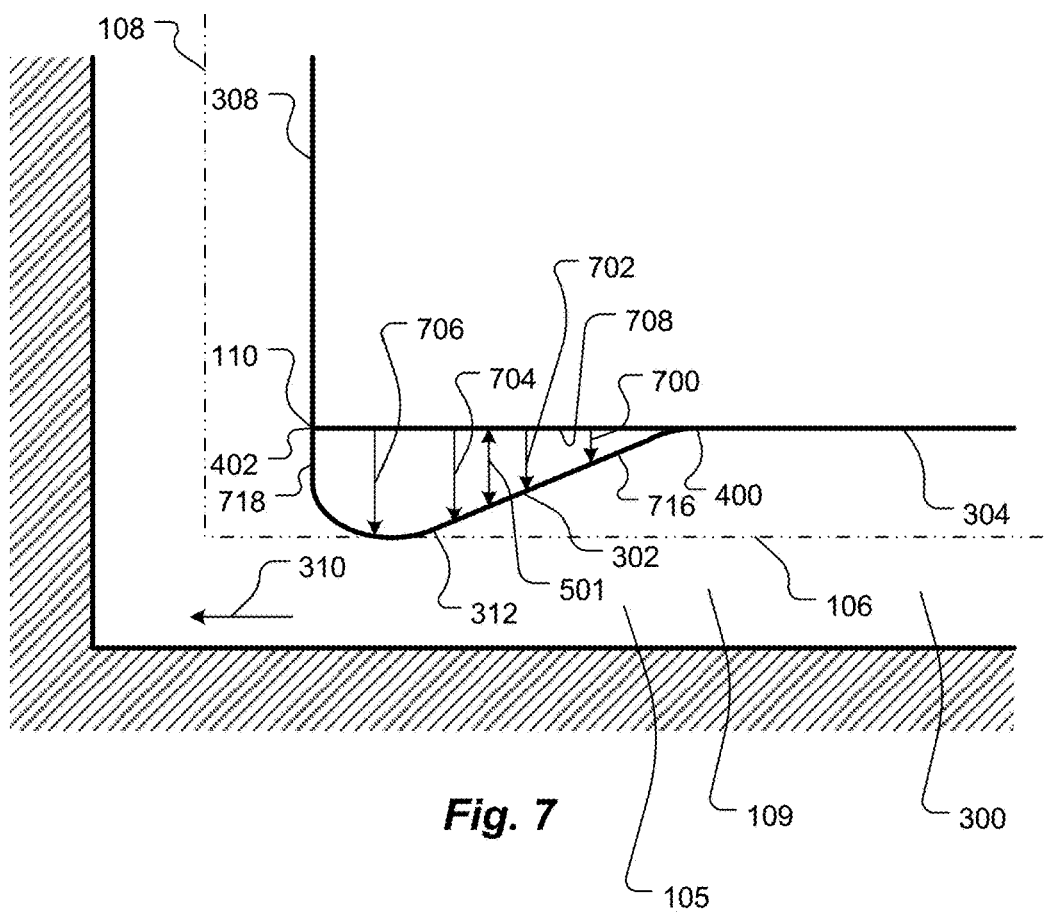
FIG. 7 is a cross-sectional view of the fluid channel and fairing of FIGS. 3-5 showing radii of curvature of the fairing's surface at various locations between a leading edge and a trailing edge of the fairing surface, according to an embodiment of the present invention.

As noted, and as can be seen in FIG. 7, the fluid channel 300 defines a volume 109 configured for liquid flow therethrough. At each location along the downstream direction 310 of at least a portion of the fairing surface 312, between the leading edge 400 and the trailing edge 402, exemplified by locations of arrows 700, 702, 704 and 706, the fairing surface 312 is displaced a positive distance, represented by lengths of the arrows, measured perpendicular to the downstream direction, i.e., the thickness of the fairing 302, into the volume 109 of the fluid channel 300 from a hypothetical channel surface 708 of the channel absent the fairing 302. Thus, the fairing surface 312 follows a curve that smoothly transitions between the leading edge 400 and the trailing edge 402, such that at least a portion of the fairing surface 312, between the leading edge 400 and the trailing edge 402, for example each of location 700-706, is displaced a positive distance, measured perpendicular to the downstream direction 310, into the volume 109 of the fluid channel 300 from the hypothetical channel surface 708 of the channel 300, absent the fairing 302. Consequently, fluid can flow no closer to the hypothetical channel surface 708 than the fairing surface 312.

Figure 8:
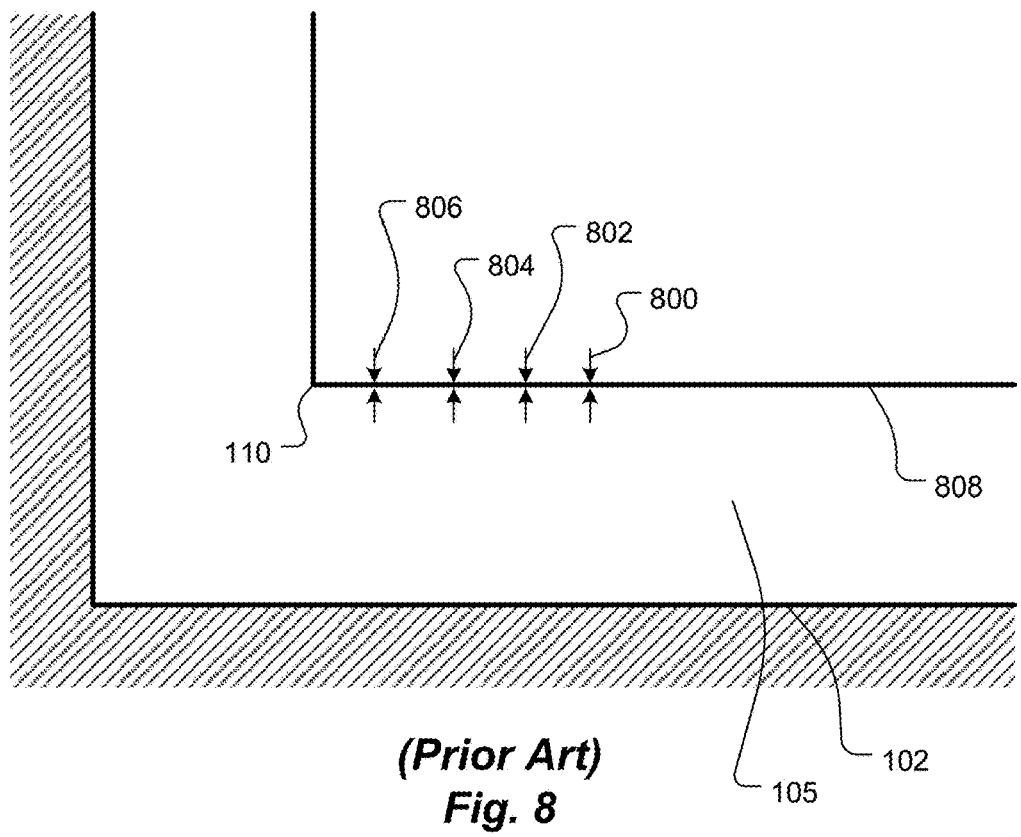
FIG. 8 is a cross-sectional view of the fluid channel of FIGS. 1 and 2 showing radii of curvature of the channel's surface, absent the fairing, at locations corresponding to the locations in FIG. 7, according to the prior art.

FIG. 8 is a cross-sectional view of a fluid channel 105, similar to the fluid channel 300 of FIG. 7, except absent the fairing 302. As noted, the fluid channel 105 defines an inner wall surface 808. The inner wall surface 808 corresponds with the hypothetical channel surface 708 discussed with respect to FIG. 7. Locations of arrows 800-806 in FIG. 8 correspond to locations of arrows 700-706 in FIG. 7. Of course, the fluid channel 105 in FIG. 7 has no fairing. Consequently, fluid can flow along the inner wall surface 808. That is, the fluid can flow closer to, indeed directly along, a hypothetical channel surface 808 in FIG. 8 than the fluid can flow along the hypothetical channel surface 708 in FIG. 7.

As can be seen in FIG. 3, at multiple locations along the fairing surface 312, the fairing 302 forces the fluid to flow a distance, for example distance 318, from the inner wall surface 304. Returning to FIG. 7, in some embodiments, at each corresponding location along the downstream direction 310, between a point, for example point 716 (FIG. 7), downstream of the leading edge 400 and a point, for example point 718, upstream of the discontinuity, the fairing 302 has a thickness 501, measured perpendicular to the downstream direction 310, greater than zero, which forces the fluid to flow further from the hypothetical channel surface 708 than the fluid could flow from the inner wall surface 808, absent the fairing 302.

In some embodiments, for example the embodiment shown in FIG. 6, at each corresponding location along the downstream direction 310, between a point, for example point 604, downstream of the discontinuity 110 and another point, for example point 606, upstream of the trailing edge 402, the fairing surface 312 has a thickness 608, measured perpendicular to the downstream direction 310, greater than zero, which forces the fluid to flow further from the hypothetical channel surface 304 than the fluid could flow from the inner wall surface 304, absent the fairing 302. Note that the downstream direction 310 changes proximate the discontinuity 110 (from horizontal to vertical, in the example of FIG. 6).

Similarly, at each corresponding location along the downstream direction 310, between the leading edge 400 and the trailing edge 402, a cross-sectional fluid flow area, measured perpendicular to the downstream direction 310 and taking into account the fairing 302, of the fluid channel 300 (FIG. 3) is no greater than a hypothetical cross-sectional fluid flow area, absent the fairing 302 (FIG. 1 or 2).

The discontinuity 110 may be defined by a portion of the fluid channel 300 having an elbow-shape, a T-shape or a Y-shape. The discontinuity 110 may be defined by a portion of the fluid channel 300 that includes an entrance region to a centrifugal pump or to a rotary valve.

The fairing 302 may be configured for permanent or temporary installation in the fluid channel 300. Alternatively, the fairing 302 may be formed as an integral part of the fluid channel 300.

The fairing surface 312 may be smooth, dimpled, rough or patterned. The fairing surface 312 may define a surface pattern configured to cause emission of an acoustic signal in response to flow of fluid along the fairing surface 312. The acoustic signal need not necessarily be humanly audible. The acoustic signal may be sonic, infrasonic or ultrasonic. The acoustic signal may be indicative of a predetermined flow characteristic of the fluid, such as speed, velocity, pressure or viscosity. For example, frequency of the acoustic signal may be proportional to speed of the fluid, and/or amplitude of the acoustic signal may be proportional to an amount of entrained solids in the fluid.

Figure 9:
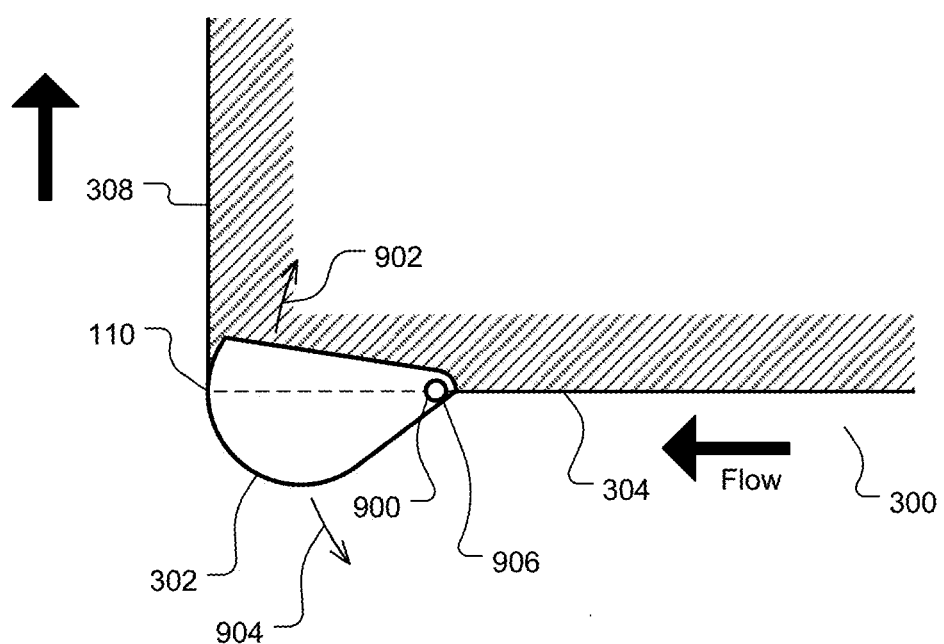
FIG. 9 is a cross-sectional view of a portion of the fluid channel of FIGS. 3-5, except with a fairing mounted to pivot about a pin, according to an embodiment of the present invention.

FIG. 9 is a cross-sectional view of a portion of the fluid channel 300, similar to the fluid channel 300 of FIGS. 3-5, except with a variation on the fairing 302 installed in the fluid channel 300, according to an embodiment of the present invention. In this embodiment, the fairing 302 is attached to a pin 900, about which the fairing 302 is configured to pivot. In a first version of this embodiment, the fairing 302 is configured to pivot only clockwise 902 from a neutral position. In a second version of this embodiment, the fairing 302 is configured to pivot only counterclockwise 904 from the neutral position. In a third version of this embodiment, the fairing 302 is configured to pivot both clockwise 902 and counterclockwise 904 from the neutral position. Optionally, any version of this embodiment includes a spring attached to the fairing 302 and configured to urge the fairing 302 toward the neutral position. In some cases, the spring is a torsional spring 906 wound about the pin 900.

In use, the fairing 302 automatically pivots about the pin 900 in response to a flow rate of the liquid flowing in the fluid channel 300. A high flow rate causes the fairing 302 to automatically pivot counterclockwise 904, to thereby automatically match flow streamlines of the liquid to prevent the flow separating from the channel surface 308, as discussed with respect to FIG. 3.

Figure 10:
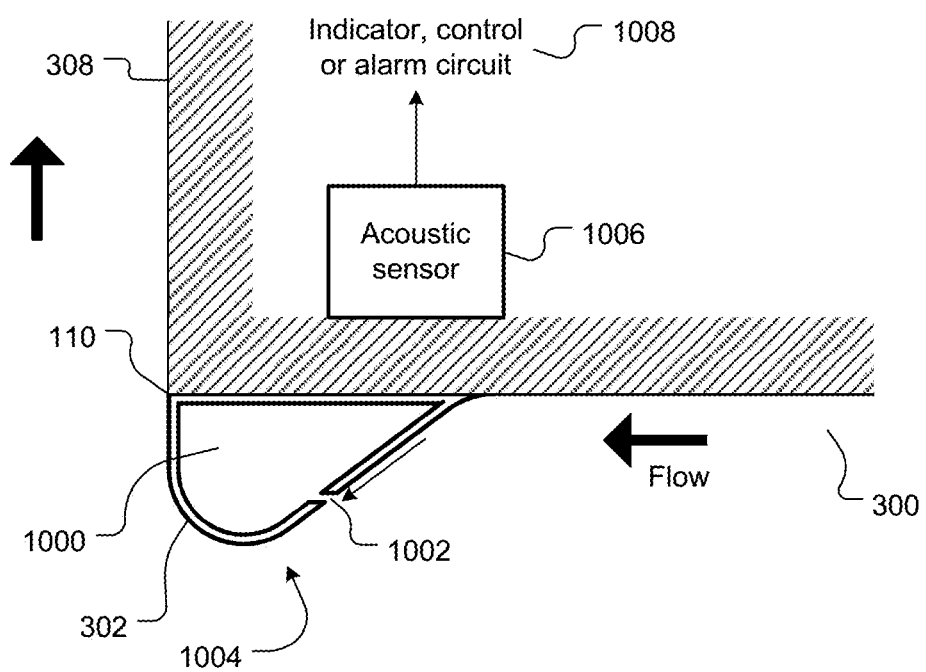
FIG. 10 is a cross-sectional view of a portion of the fluid channel of FIGS. 3-5, except with a fairing that defines a hollow portion and an aperture leading to the hollow portion, according to an embodiment of the present invention.

FIG. 10 is a cross-sectional view of a portion of the fluid channel 300, similar to the fluid channel 300 of FIGS. 3-5, except with another variation on the fairing 302 installed in the fluid channel 300, according to an embodiment of the present invention. In this embodiment, the fairing 302 defines as hollow portion 1000 and a neck and an aperture 1002 between the hollow portion 1000 and the fluid channel 300. The hollow portion 1000 and the aperture 1002 collectively form a Helmholtz resonator 1004. In response to fluid flowing across the mouth of the aperture 1002, the Helmholtz resonator 1004 emits an oscillating acoustic signal, which can be detected by an optional acoustic sensor 1006 and processed by an indicator circuit, control circuit, alarm circuit or other suitable circuit, collectively indicated at 1008. The acoustic sensor 1006 should be capable of sensing vibration or small differences in pressure transmitted through the bounding wall of the fairing 302. The acoustic signal need not necessarily be humanly audible. The acoustic signal may be sonic, infrasonic or ultrasonic. Dimensions and shape of the hollow portion 1000 and/or the aperture 1002 can be selected to tune the Helmholtz resonator 1004 to emit the acoustic signal at a predetermined flow rate, for example as an alarm when the flow rate reaches or exceeds a safe value. In another case, the dimensions and shape of the hollow portion 1000 and/or the aperture 1002 can be selected to resonate with an acoustic signal from cavitation, and thereby amplify the cavitation signal so the signal can be detected by the acoustic sensor 1006.

Figure 11:
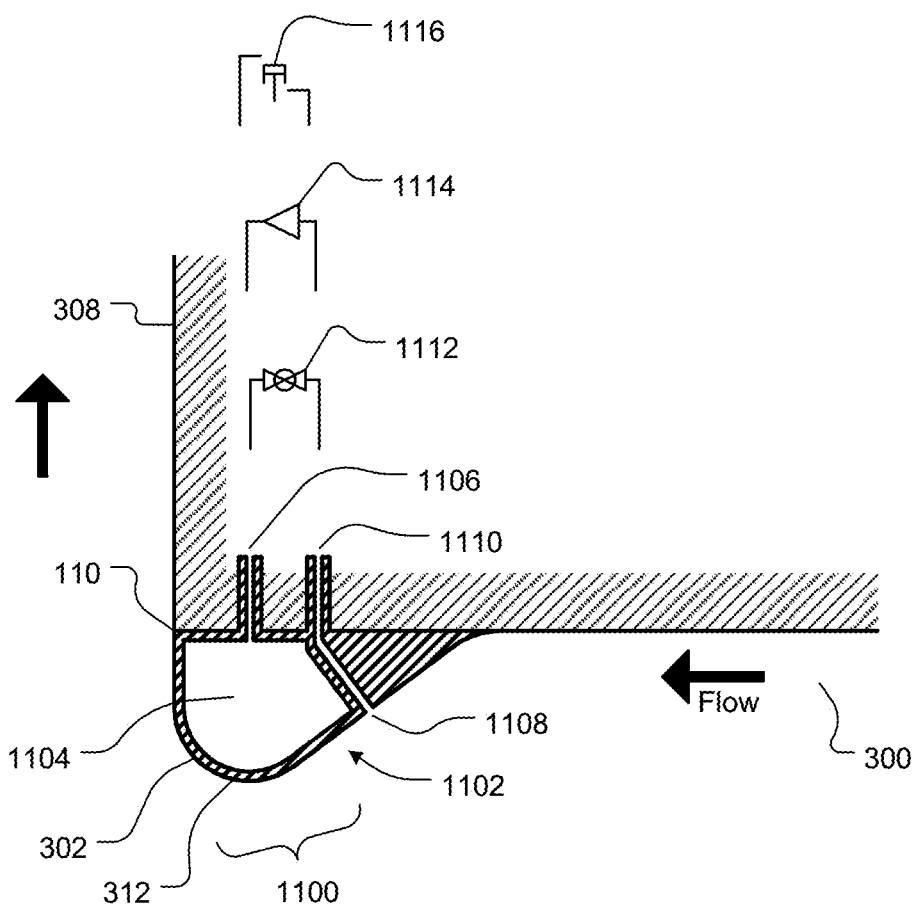
FIG. 11 is a cross-sectional view of a portion of the fluid channel of FIGS. 3-5, except with a fairing that includes an inflatable bladder to change the shape of the fairing, and an optional pressure sensing port, according to an embodiment of the present invention.

FIG. 11 is a cross-sectional view of a portion of the fluid channel 300, similar to the fluid channel 300 of FIGS. 3-5, except with yet another variation on the fairing 302 installed in the fluid channel 300, according to an embodiment of the present invention. In this embodiment, at least a portion 1100 of the fairing 302 is flexible, and in some cases resilient. The flexible portion 1100 forms part of a bladder 1102. The bladder 1102 defines a hollow portion 1104 in fluid communication with a control port 1106.

The bladder 1102 may be inflated or deflated by injecting or withdrawing a fluid into or out of the hollow portion 1104 via the control port 1106. Inflating or deflating the bladder 1102 changes the shape of at least the flexible portion 1100 of the fairing 302 and thereby changes the shape of the surface 312 of the fairing 302. The control port 1106 may be fluidically coupled to a drive mechanism, such as a piston (not shown) to change the shape of the fairing 302 under user or program control.

Optionally or alternatively, the fairing 312 defines one or more pressure sensing ports, exemplified by pressure sensing port 1108, fluidically coupled to respective gauge ports, exemplified by gauge port 1110. The pressure sensing ports 1108 may be distributed longitudinally along the fairing 302 to measure respective pressures at various locations along the fairing 302. Each gauge port 1110 may be fluidically coupled to a pressure sensor or user-readable gauge (not shown), such as to monitor pressure(s) along the surface 312 of the fairing 202. Optionally or alternatively, one or more of the gauge ports 1110 may be fluidically coupled to the control port 1106, such as directly or via a normalizing valve 1112, amplifier 1114 or piston 1116 (each of which is shown schematically), to automatically inflate or deflate the bladder 1102 in response to pressure(s) along the surface 312 of the fairing 302 or differences in pressures along the surface 312 of the fairing 302.

Figure 12:
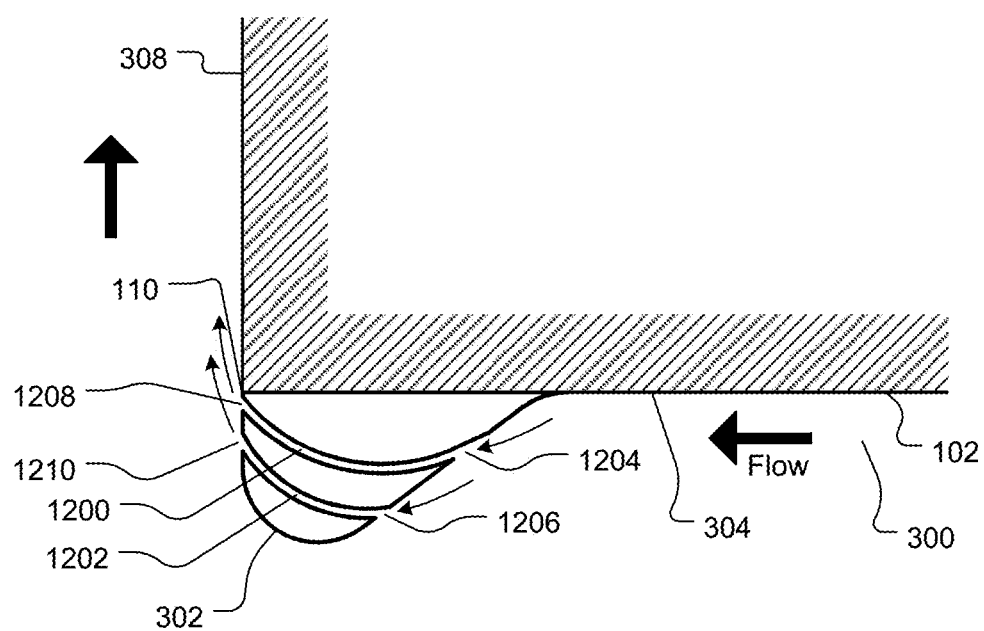
FIG. 12 is a cross-sectional view of a portion of the fluid channel of FIGS. 3-5, except with a fairing that includes one or more passages connecting respective upstream portions to respective downstream portions of the fairing, according to an embodiment of the present invention.

FIG. 12 is a cross-sectional view of a portion of the fluid channel 300, similar to the fluid channel 300 of FIGS. 3-5, except with yet another variation on the fairing 302 installed in the fluid channel 300, according to an embodiment of the present invention. In this embodiment, the fairing 302 defines one or more passages, represented by passages 1200 and 1202, through the fairing 302. The passages 1200-1202 connect respective upstream portions to respective downstream portions of the fairing 302. Each passage 1200-1202 has a respective upstream opening, represented by upstream openings 1204 and 1206, and each passage 1200-1202 has a respective downstream opening, represented by downstream openings 1208 and 1210.

The passages 1200-1202 permit at least a portion of the liquid flowing in the fluid channel 300 to bypass the full profile of the fairing 302. At relatively low flow rates, a significant portion, or all, of the liquid flowing in the fluid channel 300 can flow through the passage 1200 closest to the inner wall surface 304 of the pipe 102. As the flow rate increases, additional portions of the liquid flowing in the fluid channel 300 flow through additional passages 1200-1202 that are progressively further from the inner wall surface 304 of the pipe 102. For example, at a higher flow rate, some of the liquid flowing in the fluid channel 300 can flow through the passage 1200, and an additional portion of the liquid flowing in the fluid channel 300 flows through the passage 1202 that is next closest to the inner wall surface 304 of the pipe 102. Thus, the fairing 302 automatically adapts to various flow rates, without moving parts.

Figure 13:
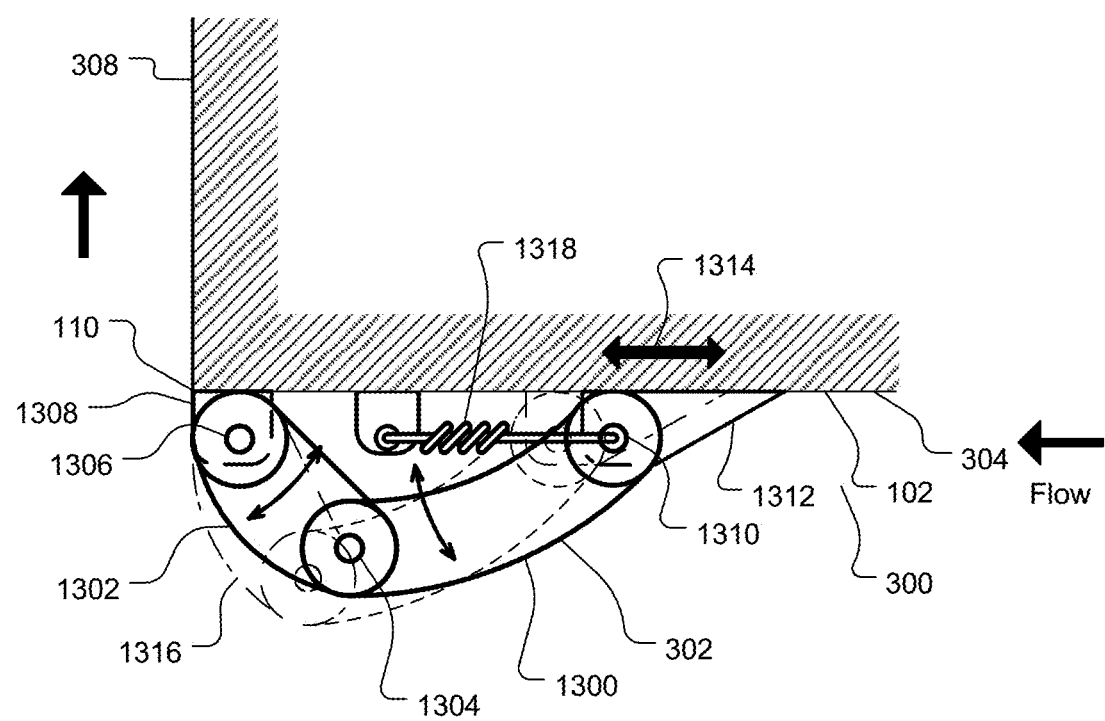
FIG. 13 is a cross-sectional view of a portion of the fluid channel of FIGS. 3-5, except with a fairing that includes two pivotally joined portions and a sliding bracket, according to an embodiment of the present invention.

FIG. 13 is a cross-sectional view of a portion of the fluid channel 300, similar to the fluid channel 300 of FIGS. 3-5, except with another variation on the fairing 302 installed in the fluid channel 300, according to an embodiment of the present invention. In this embodiment, the fairing 302 includes an upstream portion 1300 and a downstream portion 1302 joined together end-to-end by a pivot hinge 1304. A downstream end of the downstream portion 1302 is attached by a second pivot hinge 1306 to the inner wall surface 304 of the pipe 102 via a fixed bracket 1308. An upstream end of the upstream portion 1300 is attached by a pivot 1310 to the inner wall surface 304 of the pipe 102 via a sliding bracket 1312. The sliding bracket 1312 is longitudinally translatable, parallel to the flow direction, as indicated by double-headed arrow 1314.

As the sliding bracket 1312 translates toward the fixed bracket 1308, the two portions 1300 and 1302 of the fairing 302 pivot, as indicated by arrows. As a result, the pivot hinge 1304, as well as the downstream end of the portion 1300, and the upstream end of the portion 1302, extend further into the flow stream of the fluid channel 300, as shown in dashed lines 1316, thereby decreasing radius of the flow stream. Translating the sliding bracket 1312 away from the fixed bracket 1308 at least partially withdraws the pivot hinge 1304, the downstream end of the portion 1300 and the upstream end of the portion 1302 from the flow stream of the fluid channel 300, as shown in solid line. A spring 1318 urges the sliding bracket 1312 to a neutral or initial position.

Liquid flowing in the fluid channel 300 urges the sliding bracket 1312 and one portion 1300 of the fairing 302 toward the fixed bracket 1308, compressing the spring 1318, and making the curve of the fairing 302 more aggressive. If the flow rate of the liquid decreases, the spring returns the sliding bracket 1312 and the portion 1300 of the fairing 302 toward their neutral or initial positions. Thus, the fairing of FIG. 13 may be used as a flow speed regulator.

Mounting the spring 1318 on a cam (not shown) gives the spring a nonlinear spring constant. With a hysteretic spring constant, the fairing 302 can be used as a safety device or to limit flow rate through the fluid channel 300. An application of such an embodiment involves presetting the hysteretic spring constant to a value that permits a flow rate up to a predetermined value, although the fluid channel and fairing 302 could at least theoretically sustain a higher flow rate. The predetermined flow rate may be selected to protect other equipment or plumbing, or the predetermined flow rate may be set to a higher flow rate, and the hysteretic spring constant can then be adjusted to allow the increased flow rate.

Figure 14:
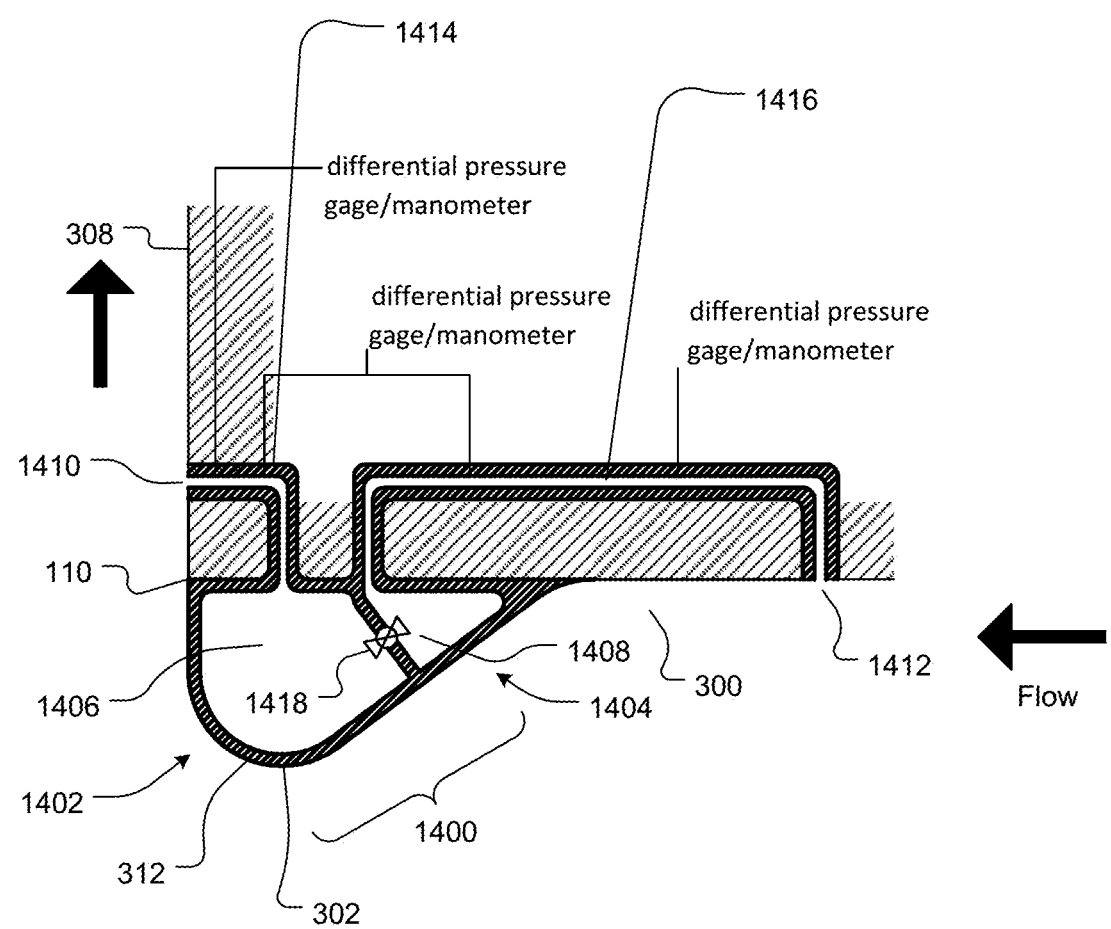
FIG. 14 is a cross-sectional view of a portion of the fluid channel of FIGS. 3-5, except with a fairing that includes multiple bladders in fluid communication with respective ports in the fluid channel to automatically regulate the shape of the fairing, based on respective pressures at the ports, according to an embodiment of the present invention.

FIG. 14 is a cross-sectional view of a portion of the fluid channel 300, similar to the fluid channel 300 of FIGS. 3-5, except with yet another variation on the fairing 302 installed in the fluid channel 300, according to an embodiment of the present invention. In this embodiment, at least a portion 1400 of the fairing 302 is flexible, and in some cases resilient. The flexible portion 1400 forms part of multiple bladders, represented by bladders 1402 and 1404. Each bladder 1402-1404 defines a respective hollow portion, represented by hollow portions 1406 and 1408. The hollow portions 1406-1408 are in fluid communication with respective ports, represented by ports 1410 and 1412, downstream and upstream of the fairing 302 in the fluid channel 300, via respective channels, represented by channels 1414 and 1416, to automatically regulate the shape of the fairing 302, based on respective pressures at the ports 1410-1412.

Optionally, the hollow portions 1406 and 1408 are communicably coupled to each other, such as via a one-way valve 1418 to normalize pressures in the hollow portions 1406-1408, such as if pressure in one of the hollow portions 1408 exceeds a predetermined value.

Fairings at a Confluence of Fluid Flows

Figure 15:
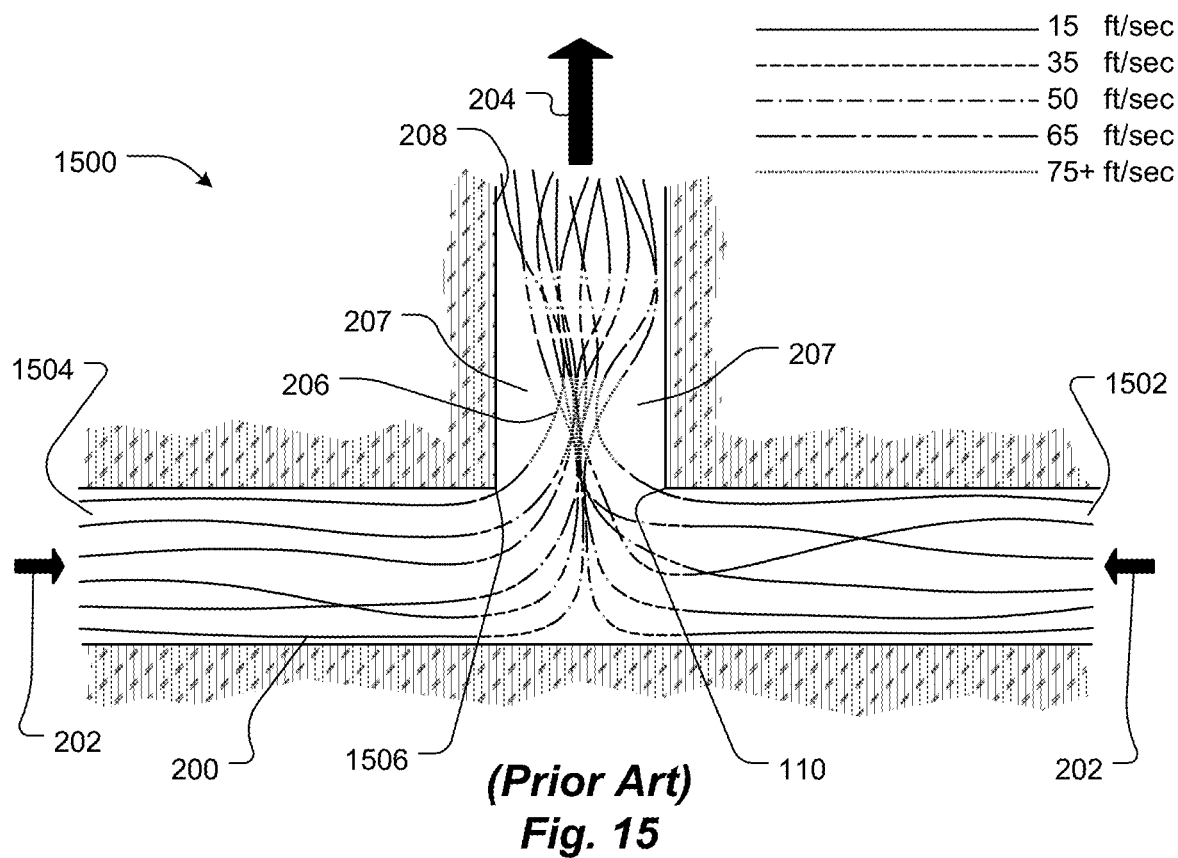
FIG. 15 is a cross-sectional view of a fluid channel similar to that of FIG. 1, except of a T-joint, including streamlines representing fluids flowing through the fluid channel, according to the prior art.
Figure 16:
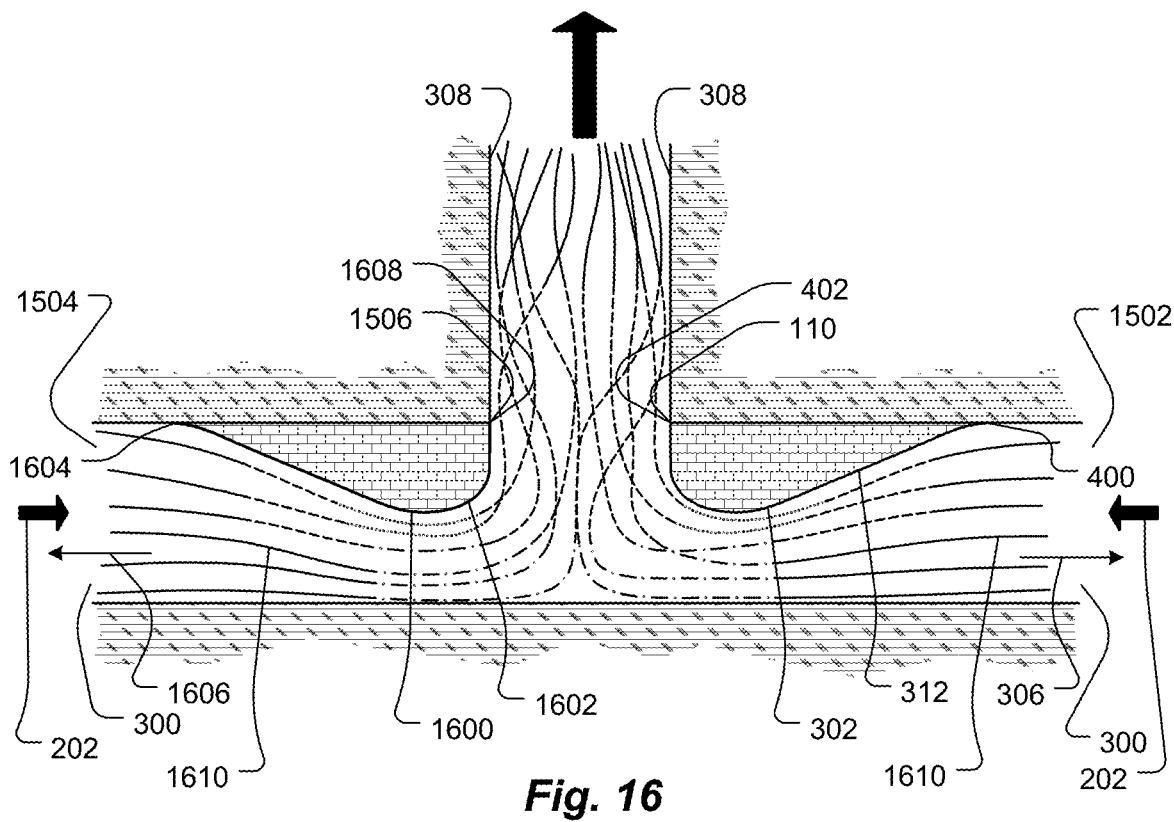
FIG. 16 is a cross-sectional view of the fluid channel of FIG. 15, except with fairings installed in the fluid channel, according to an embodiment of the present invention.

The fairings 302 in FIGS. 3-7 and 9-14 are described in contexts of elbows. However, principles of the fairings 302 also apply to other types of pipes, such as T-joints, Y-joints and other joints having multiple input ports where multiple fluid flows join together, such as to produce a single outlet. FIG. 15 a cross-sectional view of a T-joint 1500 having two input ports 1502 and 1504. Similar to FIG. 2, FIG. 15 includes streamlines 200 to represent fluids flowing through the T-joint 1500. Line patterns of the streamlines 200 represent exemplary flow speeds, as indicated in a key in FIG. 15. The flow speeds shown in FIGS. 15 and 16 are meant to be representative in nature and are described based on analytical modeling of flow behavior in hypothetical examples. Flow speeds in other examples may be higher or lower or extend over different ranges from those shown in FIGS. 15 and 16.

Arrows 202 and 204 indicate directions of the fluid flows. As a result of two sudden direction changes, the flow streamlines 200 are unable to follow the sharp edges of the discontinuities 110 and 1506, leading to a vena contracta 206 and resulting in a pressure drop and flow separations 207 of the streamlines 200 from the inner surface 208 of the fluid channel.

The problems illustrated in FIG. 15 can occur in many contexts, including in rotary and 3-way valves, spill ways and exhaust or relief headers. Sharp corners at entry and exit regions of the header, valve, etc. and slots within in a rotary valve are discontinuities and, as discussed with respect to FIGS. 1, 2 and 15, consequential sudden changes in directions of liquid flow lead to vena contracta, resulting in pressure drops and flow separations from inner surfaces. At high liquid velocity flows, the pressure drops and wall separations may lead to cavitation and eventually to structural damage.

FIG. 16 is a cross-sectional view of a fluid channel 300, similar to the fluid channel of FIG. 15, except with two fairings 302 and 1600 installed in the fluid channel 300, one fairing 302 and 1600 per input port 1502 and 1504. As discussed with reference to FIGS. 3-5, the fairings 302 and 1600 provide smooth transitions from respective portions of the fluid channel 300 upstream of the discontinuities 110 and 1506 to respective portions of the fluid channel 300 downstream of the discontinuities 110 and 1506. The fairings 302 and 1600 thus define respective transition regions.

The second fairing surface 1602 extends from a leading edge 1604 of the second fairing surface 1602 located upstream 1606 of the discontinuity 1506 to a trailing edge 1608 of the second fairing surface 1602 located downstream of the leading edge 1604, at least as far as the discontinuity 1506.

The fairings 302 and 1600 cause fluid to flow smoothly, following surfaces 312 and 1602 of the fairings 302 and 1600 continuously around the transition regions and the discontinuities 110 and 1506, thereby increasing fluid velocity at which flow separation from the surface of the fluid 300 channel would occur, compared to the prior art, and reducing cavitation for a given fluid velocity. Improved flow behavior is evident from streamlines 1610.

Fairing Shape

Figure 17:
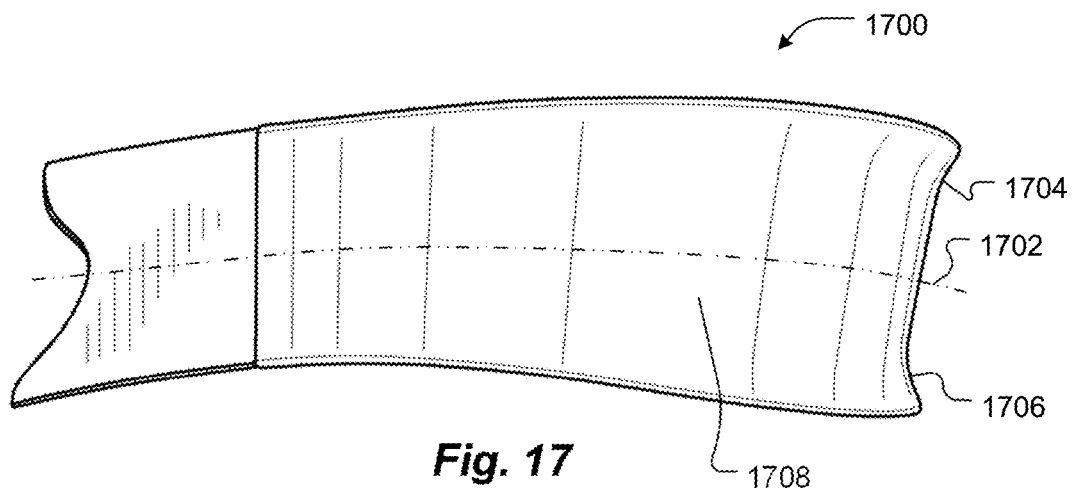
FIGS. 17, 18 and 19 are respective top, side perspective and side views of an exemplary fairing, according to an embodiment of the present invention.
Figure 18:
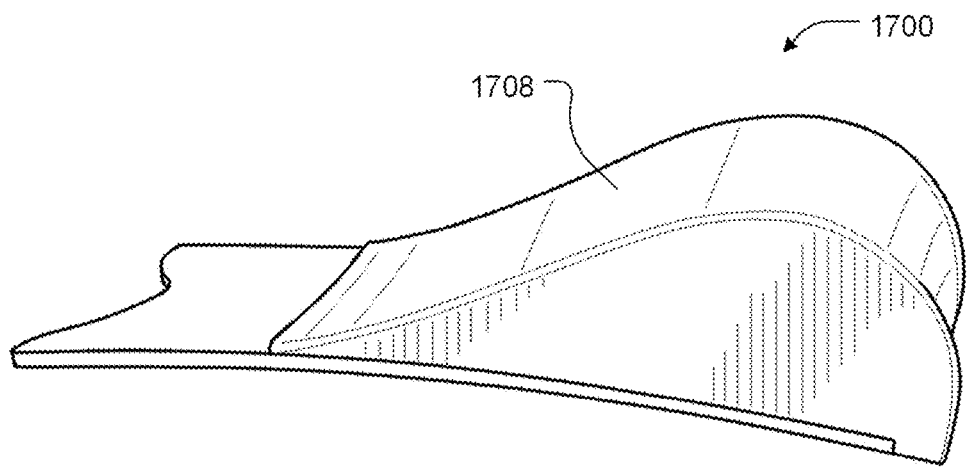
Figure 19:
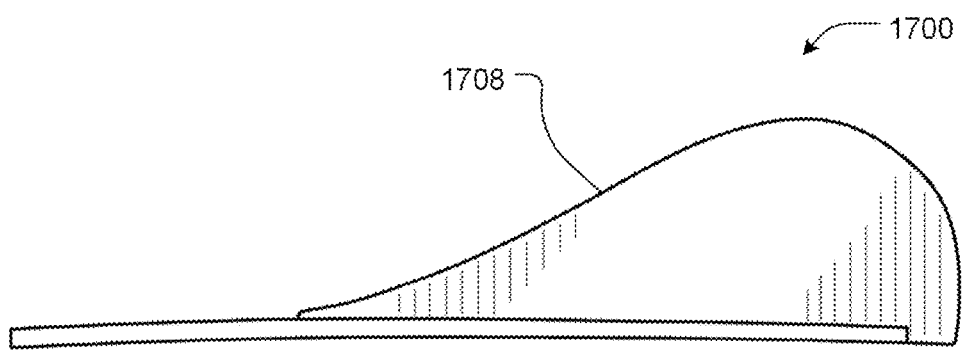

FIGS. 17, 18 and 19 are respective top, side perspective and side views of an exemplary fairing 1700, according to an embodiment of the present invention. As can be seen in FIG. 17, a longitudinal axis 1702 of the fairing 1700 is curved, although in other embodiments the longitudinal axis is straight. Also visible in FIG. 17 are concave regions 1704 and 1706 on portions of the surface 1708 of the fairing 1700.

Figure 20:
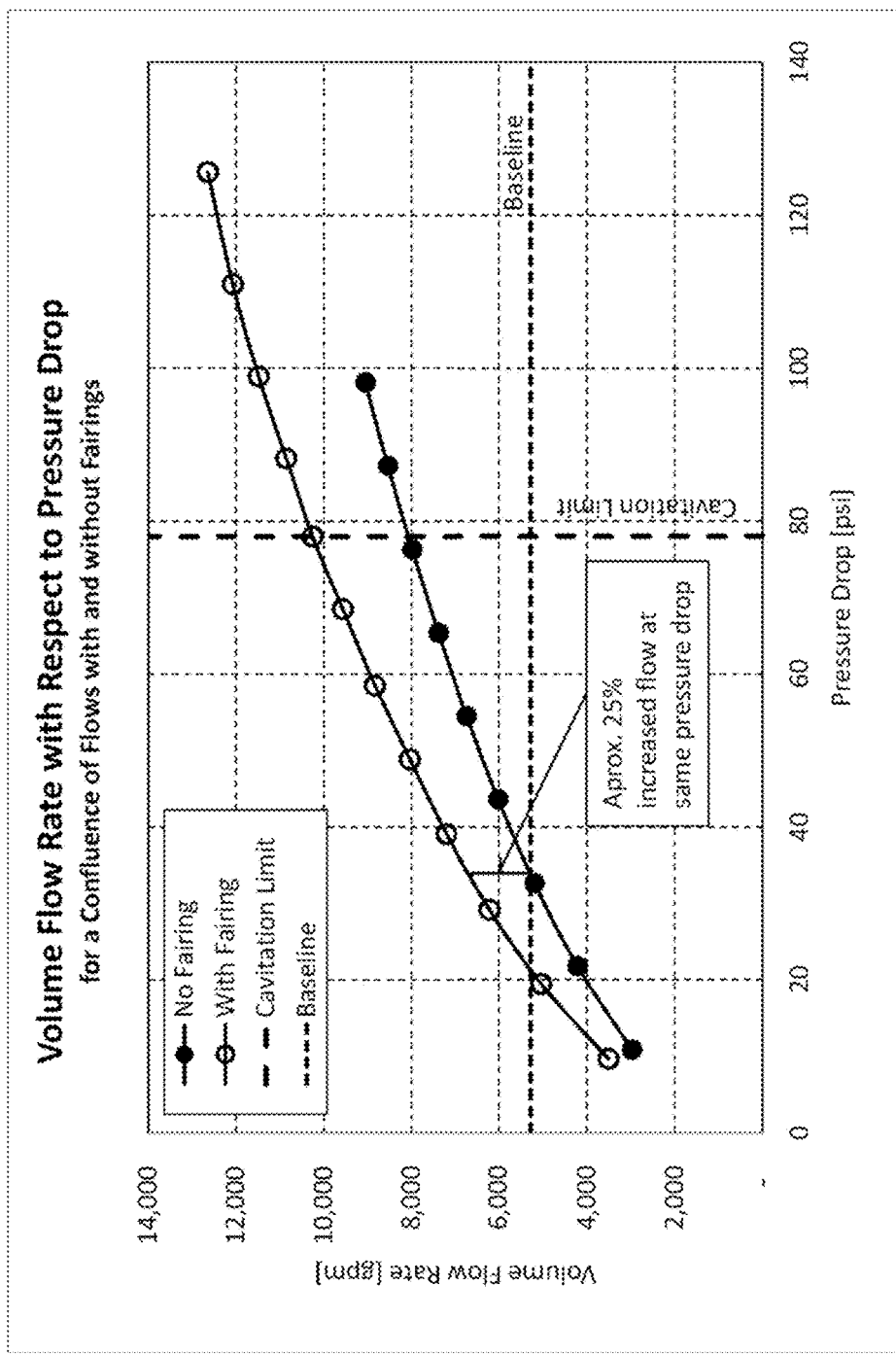
FIG. 20 is a graph characterizing volume flow rate with respect to pressure drop, in an exemplary application of the fairing of FIGS. 17-19, according to an embodiment of the present invention.

An analytical characterization of flow rate, with respect to pressure drop, in a confluence of fluid flows application that uses the fairing of FIGS. 17-19 and where hydrocarbons are pumped at high volumetric flowrates indicates that a 50% reduction in pressure drop for a given flow rate could be re-equated to nearly 25% more volumetric flow, for the same pumping energy required (pressure drop). A typical characterization of this performance is shown in FIG. 20.

Fairings in Control Valve Cage Trim Assemblies

With the proliferation of 3D printing technology, fairings, as described herein, may be fabricated in control valve cage trim assemblies and other components, with corresponding improvements in fluidic performance. Current cage trim designs appear to be limited to flow path profiles that are manufactured using traditional methods and include feature sets that include drilled holes, wire-cut square profile channels and features that can be milled from an exterior of the trim's cylinder. However, fairings, according to the present disclosure, may be incorporated in valve trims with integral designs, such as via additive manufacturing methods.

Figure 21:
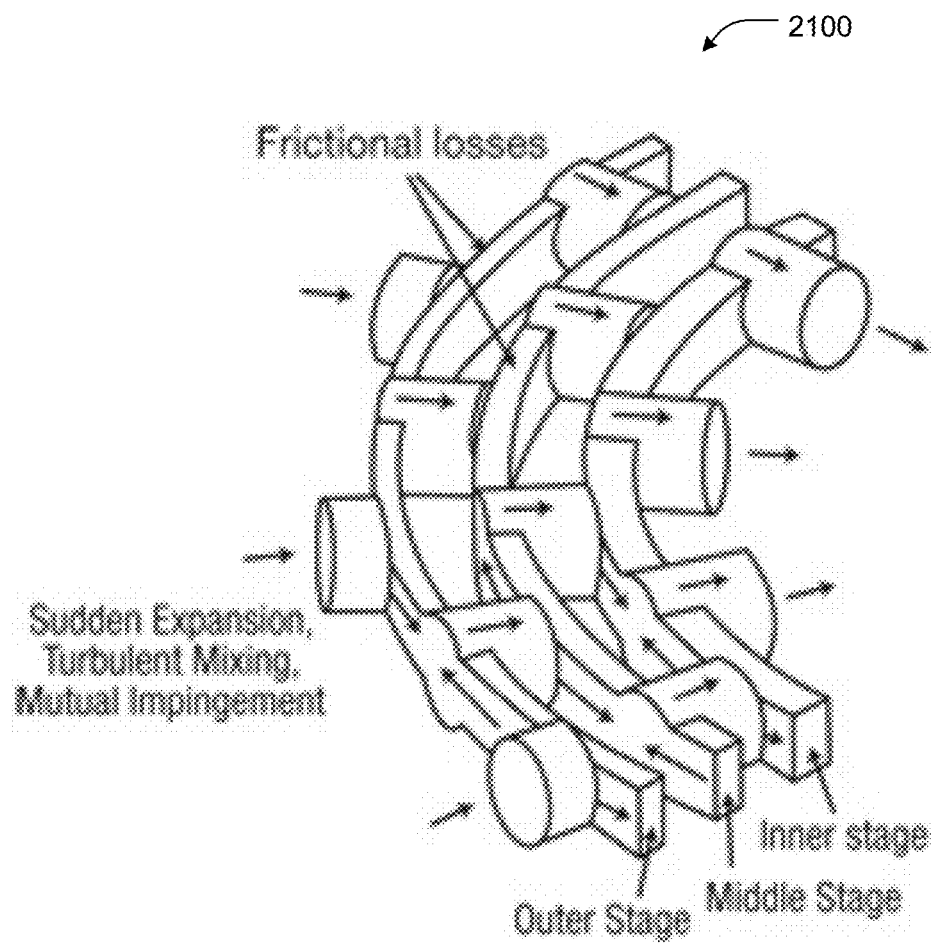
FIG. 21 is a perspective view of a portion of a conventional multi-stage cavitation mitigation globe and angle valve trim, according to the prior art.

Conventional cavitation mitigating designs may be improved with addition of the fairings described herein. For example, a portion of a conventional multi-stage cavitation mitigation globe and angle valve trim 1200 is shown in FIG. 21 (diagram attributed to Flowserve Corporation). Fairings (not shown) may be fabricated or installed at sharp turns in the valve trim 2100.

REFERENCES

[1] SA-RP75.23-1995—Recommended Practice—Considerations for Evaluating Control Valve Cavitation, Instrument Society of America, 1995, Research Triangle Park, North Carolina.

[2] Monsen, J., "Liquid Flow in Control Valves," Valin® blog, Jan. 30, 2017, https://www.valin.com/resources/blog/liquid-flow-control-valves-choked-flow-cavitation-and-flashing.

[3] Roth, K. W., Stares, J. A., "Avoid Control Valve Application Problems with Physics-based Models," Hydrocarbon Processing, August 2001.

[4] Stares, J., "Control Valve Cavitation, Damage Control," Dresser-Masoneilan publication, February 2007.

While the invention is described through the above-described exemplary embodiments, modifications to, and variations of, the illustrated embodiments may be made without departing from the inventive concepts disclosed herein. For example, although specific parameter values, such as angles, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

As used herein, numerical terms, such as "first," "second" and "third," are used to distinguish respective fairings from one another and are not intended to necessarily indicate any particular order or total number of fairings in any particular embodiment. Thus, for example, a given embodiment may include only a second fairing and a third fairing.

What is claimed is:

1. A method for increasing flow capacity of a fluid channel in a downstream direction, the fluid channel having a channel surface configured for liquid flow there along, the channel surface including a discontinuity, the method comprising:
disposing a fairing adjacent the discontinuity, the fairing defining a respective fairing surface absent convolutions transverse to the downstream direction, the fairing surface:
being located entirely in the fluid channel;
being configured for liquid flow there along; and
extending from a respective leading edge of the fairing surface located upstream of the discontinuity to a respective trailing edge of the fairing surface located downstream of the leading edge at least as far as the discontinuity; wherein:
at the leading edge, the fairing surface is tangent the channel surface;
at the trailing edge, the fairing surface is tangent the channel surface; and
the fairing surface follows a curve that smoothly transitions between the leading edge and the trailing edge.

2. A method according to claim 1, wherein the fairing surface follows a reverse curve that smoothly transitions between the leading edge and the trailing edge.

3. A method according to claim 1, wherein the trailing edge of the fairing surface is located no further downstream than the discontinuity.

4. A method according to claim 1, wherein the trailing edge of the fairing surface is located downstream of the discontinuity.

5. A method according to claim 3, wherein the fairing surface follows an at least two-cycle reverse curve.

6. A method according to claim 1, wherein the fluid channel defines a volume configured for liquid flow therethrough and disposing the fairing comprises disposing the fairing such that at least a portion of the fairing surface between the leading edge and the trailing edge is displaced a positive distance, measured perpendicular to the downstream direction, into the volume of the fluid channel from a hypothetical channel surface of the channel absent the fairing.

7. A method according to claim 1, wherein the fluid channel defines a volume configured for liquid flow therethrough and disposing the fairing comprises disposing the fairing such that, at each location along the downstream direction, between the leading edge and the trailing edge, the fairing surface is displaced a positive distance, measured perpendicular to the downstream direction, into the volume of the fluid channel from a hypothetical channel surface of the channel absent the fairing.

8. A method according to claim 1, wherein disposing the fairing comprises disposing the fairing such that, at each corresponding location along the downstream direction, between the leading edge and the trailing edge, a cross-sectional fluid flow area, measured perpendicular to the downstream direction and taking into account the fairing, of the fluid channel is no greater than a hypothetical cross-sectional fluid flow area absent the fairing.

9. A method according to claim 1, wherein the discontinuity is defined by a portion of the fluid channel: (a) having an elbow-shape, a T-shape or a Y-shape or (b) comprising an entrance region to a centrifugal pump or to a rotary valve.

10. A method according to claim 1, wherein disposing the fairing adjacent the discontinuity comprises temporarily installing the fairing in the fluid channel.

11. A method according to claim 1, wherein disposing the fairing adjacent the discontinuity comprises forming the fairing as an integral part of the fluid channel.

12. A method according to claim 1, wherein the fairing surface is smooth.

13. A device for increasing flow capacity of a fluid channel in a downstream direction, the fluid channel having a channel surface configured for liquid flow there along, the channel surface including a discontinuity, the device comprising:
a fairing defining a respective fairing surface, the fairing surface:
being located entirely in the fluid channel;
being configured for liquid flow there along; and
extending from a respective leading edge of the fairing surface located upstream of the discontinuity to a respective trailing edge of the fairing surface located downstream of the leading edge at least as far as the discontinuity; wherein:
at the leading edge, the fairing surface is tangent the channel surface;
at the trailing edge, the fairing surface is tangent the channel surface; and
the fairing surface follows a curve that smoothly transitions between the leading edge and the trailing edge, wherein the fairing surface is dimpled, rough or patterned.

14. A device according to claim 13, wherein the fairing surface defines a surface pattern configured to cause, in response to flow of liquid there along, emission of an acoustic signal indicative of a predetermined flow characteristic of the fluid.

15. A device for increasing flow capacity of a fluid channel in a downstream direction, the fluid channel having a channel surface configured for liquid flow there along, the channel surface including a discontinuity, the device comprising:
a fairing defining a respective fairing surface, the fairing surface:
being located entirely in the fluid channel;
being configured for liquid flow there along; and
extending from a respective leading edge of the fairing surface located upstream of the discontinuity to a respective trailing edge of the fairing surface located downstream of the leading edge at least as far as the discontinuity; wherein:
at the leading edge, the fairing surface is tangent the channel surface;
at the trailing edge, the fairing surface is tangent the channel surface; and the fairing surface follows a curve that smoothly transitions between the leading edge and the trailing edge;
the fairing comprises a pin, and the fairing is configured to pivot about the pin.

16. A device for increasing flow capacity of a fluid channel in a downstream direction, the fluid channel having a channel surface configured for liquid flow there along, the channel surface including a discontinuity, the device comprising:
a fairing defining a respective fairing surface, the fairing surface:
being located entirely in the fluid channel;
being configured for liquid flow there along; and
extending from a respective leading edge of the fairing surface located upstream of the discontinuity to a respective trailing edge of the fairing surface located downstream of the leading edge at least as far as the discontinuity; wherein:
at the leading edge, the fairing surface is tangent the channel surface;
at the trailing edge, the fairing surface is tangent the channel surface; and
the fairing surface follows a curve that smoothly transitions between the leading edge and the trailing edge;
the fairing defines as hollow portion and an aperture between the hollow portion and the fluid channel, wherein the hollow portion and the aperture are configured to emit an oscillating acoustic signal in response to a fluid flow across the aperture.

17. A device for increasing flow capacity of a fluid channel in a downstream direction, the fluid channel having a channel surface configured for liquid flow there along, the channel surface including a discontinuity, the device comprising:
a fairing defining a respective fairing surface, the fairing surface:
being located entirely in the fluid channel;
being configured for liquid flow there along; and
extending from a respective leading edge of the fairing surface located upstream of the discontinuity to a respective trailing edge of the fairing surface located downstream of the leading edge at least as far as the discontinuity; wherein:
at the leading edge, the fairing surface is tangent the channel surface;
at the trailing edge, the fairing surface is tangent the channel surface; and
the fairing surface follows a curve that smoothly transitions between the leading edge and the trailing edge;
the fairing defines a bladder in fluid communication with a control port and configured to change the shape of the surface of the fairing in response to inflation of the bladder.

18. A device according to claim 17, wherein the fairing defines at least one pressure sensing port fluidically coupled to a respective gauge port.

19. A device according to claim 18, wherein the gauge port is fluidically coupled to the control port.

20. A method according to claim 1, wherein the fairing defines at least one passage through the fairing, each passage fluidically connecting a respective upstream portion to a respective downstream portion of the fairing, each passage defining a respective upstream opening and a respective downstream opening, each passage being configured to permit at least a portion of liquid flowing in the fluid channel to bypass full profile of the fairing.

21. A device for increasing flow capacity of a fluid channel in a downstream direction, the fluid channel having a channel surface configured for liquid flow there along, the channel surface including a discontinuity, the device comprising:
a fairing defining a respective fairing surface, the fairing surface:
being located entirely in the fluid channel;
being configured for liquid flow there along; and
extending from a respective leading edge of the fairing surface located upstream of the discontinuity to a respective trailing edge of the fairing surface located downstream of the leading edge at least as far as the discontinuity; wherein:
at the leading edge, the fairing surface is tangent the channel surface;
at the trailing edge, the fairing surface is tangent the channel surface; and
the fairing surface follows a curve that smoothly transitions between the leading edge and the trailing edge;
the fairing comprises an upstream portion and a downstream portion joined together by a pivot hinge, wherein an upstream end of the upstream portion is translatably attached to the channel surface, and the two portions and are configured to pivot in response to translation of the upstream end of the upstream portion and thereby extend the pivot hinge, the downstream end of the upstream portion and the upstream end of the downstream portion further into the fluid channel, the fairing further comprising a spring configured to urge the upstream end of the upstream portion to a neutral position.

22. A device for increasing flow capacity of a fluid channel in a downstream direction, the fluid channel having a channel surface configured for liquid flow there along, the channel surface including a discontinuity, the device comprising:
a fairing defining a respective fairing surface, the fairing surface:
being located entirely in the fluid channel;
being configured for liquid flow there along; and
extending from a respective leading edge of the fairing surface located upstream of the discontinuity to a respective trailing edge of the fairing surface located downstream of the leading edge at least as far as the discontinuity; wherein:
at the leading edge, the fairing surface is tangent the channel surface;
at the trailing edge, the fairing surface is tangent the channel surface; and
the fairing surface follows a curve that smoothly transitions between the leading edge and the trailing edge;
the fairing defines:
a first bladder in fluid communication with a port downstream of the fairing in the fluid channel; and
a second bladder in fluid communication with a port upstream of the fairing in the fluid channel;
wherein the first and second bladders are configured to automatically regulate shape of the fairing, based on respective pressures at the ports.

23. A method according to claim 1, wherein the channel surface includes a second discontinuity, the method further comprising:

disposing a second fairing defining a respective second fairing surface, the second fairing surface:
being located entirely in the fluid channel;
being configured for liquid flow there along; and
extending from a respective leading edge of the second fairing surface located upstream of the discontinuity to a respective trailing edge of the second fairing surface located downstream of the leading edge at least as far as the discontinuity; wherein:
at the leading edge, the second fairing surface is tangent the channel surface;
at the trailing edge, the second fairing surface is tangent the channel surface; and
the second fairing surface follows a curve that smoothly transitions between the leading edge and the trailing edge.

24. A method according to claim 1, wherein the fairing surface is dimpled, rough or patterned.

25. A method according to claim 24, wherein the fairing surface defines a surface pattern configured to cause, in response to flow of fluid there along, emission of an acoustic signal indicative of a predetermined flow characteristic of the fluid.

26. A method according to claim 1, wherein the fairing comprises a pin, and the fairing is configured to pivot about the pin.

27. A method according to claim 1, wherein the fairing defines as hollow portion and an aperture between the hollow portion and the fluid channel, wherein the hollow portion and the aperture are configured to emit an oscillating acoustic signal in response to a fluid flow across the aperture.

28. A method according to claim 1, wherein the fairing defines a bladder in fluid communication with a control port and configured to change the shape of the surface of the fairing in response to inflation of the bladder.

29. A method according to claim 28, wherein the fairing defines at least one pressure sensing port fluidically coupled to a respective gauge port.

30. A method according to claim 29, wherein the gauge port is fluidically coupled to the control port.

31. A method according to claim 1, wherein the fairing comprises an upstream portion and a downstream portion joined together by a pivot hinge, wherein an upstream end of the upstream portion is translatably attached to the channel surface, and the two portions and are configured to pivot in response to translation of the upstream end of the upstream portion and thereby extend the pivot hinge, the downstream end of the upstream portion and the upstream end of the downstream portion further into the fluid channel, the fairing further comprising a spring configured to urge the upstream end of the upstream portion to a neutral position.

32. A method according to claim 1, wherein the fairing defines:
a first bladder in fluid communication with a port downstream of the fairing in the fluid channel; and
a second bladder in fluid communication with a port upstream of the fairing in the fluid channel; wherein the first and second bladders are configured to automatically regulate shape of the fairing, based on respective pressures at the ports.

* * * * *